United States Patent
Maeda et al.

(10) Patent No.: US 9,505,866 B2
(45) Date of Patent: Nov. 29, 2016

(54) ACRYLIC RUBBER GRAFT COPOLYMER AND THERMOPLASTIC RESIN COMPOSITION

(75) Inventors: Kazuhiko Maeda, Ube (JP); Takahiro Nakamura, Ube (JP); Hironori Matsuyama, Ube (JP)

(73) Assignee: UMG ABS, LTD., Tokyo (JP)

( * ) Notice: Subject to any disclaimer, the term of this patent is extended or adjusted under 35 U.S.C. 154(b) by 0 days.

(21) Appl. No.: 14/003,153

(22) PCT Filed: Mar. 23, 2012

(86) PCT No.: PCT/JP2012/057525
§ 371 (c)(1),
(2), (4) Date: Sep. 4, 2013

(87) PCT Pub. No.: WO2012/133190
PCT Pub. Date: Oct. 4, 2012

(65) Prior Publication Data
US 2013/0345362 A1     Dec. 26, 2013

(30) Foreign Application Priority Data
Mar. 29, 2011 (JP) .................. 2011-072129

(51) Int. Cl.
*C08L 51/04* (2006.01)
*C08F 265/04* (2006.01)
*C08L 51/00* (2006.01)

(52) U.S. Cl.
CPC ............ *C08F 265/04* (2013.01); *C08L 51/003* (2013.01); *C08L 51/04* (2013.01); *C08L 2205/02* (2013.01)

(58) Field of Classification Search
CPC ............... C08L 51/04; C08L 51/003
See application file for complete search history.

(56) References Cited

U.S. PATENT DOCUMENTS

| | | | | |
|---|---|---|---|---|
| 3,830,878 A * | 8/1974 | Kato et al. | ........................ | 25/72 |
| 4,108,946 A * | 8/1978 | Kamada et al. | ............... | 525/310 |
| 4,730,023 A * | 3/1988 | Sato et al. | ....................... | 525/73 |
| 4,906,699 A | 3/1990 | Siol et al. | | |
| 4,912,162 A * | 3/1990 | Kishida et al. | .................. | 525/67 |
| 5,196,480 A * | 3/1993 | Seitz et al. | ....................... | 525/71 |
| 2004/0097648 A1 | 5/2004 | Nakai et al. | | |
| 2011/0204528 A1* | 8/2011 | Matsutani et al. | ............ | 257/787 |

FOREIGN PATENT DOCUMENTS

| JP | S59-232138 A | 12/1984 | | |
|---|---|---|---|---|
| JP | H07-304824 A | 11/1995 | | |
| JP | H08-134312 A | 5/1996 | | |
| JP | H08-295784 A | 11/1996 | | |
| JP | 2004-346187 A | 12/2004 | | |
| JP | 2004-346237 A | 12/2004 | | |
| JP | 2006-016524 A | 1/2006 | | |
| JP | 2006-241283 A | 9/2006 | | |
| JP | 2007-091970 A | 4/2007 | | |
| WO | WO 2010026988 A1 * | 3/2010 | ............. | G03F 7/023 |

* cited by examiner

Primary Examiner — Mark Kaucher
(74) Attorney, Agent, or Firm — Manabu Kanesaka

(57) ABSTRACT

An acrylic rubber graft copolymer is obtained by graft polymerizing a vinyl monomer in the presence of a rubbery polymer including acrylate ester monomer units and polyfunctional monomer units, wherein the total amount of the polyfunctional monomer units in the rubbery polymer is 0.3 to 3 parts by mass with respect to 100 parts by mass of the acrylate ester monomer units, and the polyfunctional monomer units include 30 to 95 mass % of polyfunctional monomer units having two unsaturated bonds and 5 to 70 mass % of polyfunctional monomer units having three unsaturated bonds with respect to 100 mass % of the total of the polyfunctional monomer units. A thermoplastic resin composition includes the acrylic rubber graft copolymer.

8 Claims, No Drawings

ACRYLIC RUBBER GRAFT COPOLYMER AND THERMOPLASTIC RESIN COMPOSITION

FIELD OF INVENTION

The present invention relates to acrylic rubber graft copolymers which may be used as various industrial materials, and to thermoplastic resin compositions and thermoplastic resin shaped articles including the copolymers.

BACKGROUND ART

Thermoplastic resins such as styrene-acrylonitrile copolymer resins, α-methylstyrene-acrylonitrile copolymer resins and styrene-acrylonitrile-phenylmaleimide copolymer resins are conventionally blended together with graft polymers obtained by graft polymerizing rubbery polymers with monomers providing compatibility with the resins. The resultant materials represented by ABS resins and ASA resins exhibit impact resistance and have widespread use. Of these materials, ASA resins involving such rubbery polymers as alkyl(meth)acrylate saturated rubbers characteristically exhibit good weather resistance.

On the other hand, ASA resins have drawbacks in that colored shaped articles have an unsatisfactory appearance due to reasons such as poor color production as well as exhibit low impact resistance. In order to improve the balance between poor appearance and impact resistance, ASA resins are proposed which involve, as components, acrylate ester rubbery polymers having a combination of rubber particles with different particle diameter distributions (Patent Literatures 1 to 3).

Further, in order to complement the defects of ASA resins, a thermoplastic resin composition is proposed which involves an ASA resin in combination with an AES resin including an ethylene-propylene rubber component (Patent Literature 4).

However, these thermoplastic resin compositions are unsatisfactory in any of impact resistance, rigidity, weather resistance and pigment coloring properties and cannot sufficiently meet the recent demanding needs.

CITATION LIST

Patent Literature

Patent Literature 1: Japanese Patent Publication 59-232138A
Patent Literature 2: Japanese Patent Publication 4-225051A
Patent Literature 3: Japanese Patent Publication 8-134312A
Patent Literature 4: Japanese Patent Publication 2004-346187A

OBJECT AND SUMMARY OF INVENTION

The present invention has been made in view of the circumstances described above. It is therefore an object of the invention to provide acrylic rubber graft copolymers which themselves are excellent in impact resistance, rigidity and appearance and are capable of giving thermoplastic resin compositions exhibiting excellent impact resistance, rigidity and appearance, as well as to provide thermoplastic resin compositions including the acrylic rubber graft copolymers.

Solution to Problem

The present inventors carried out extensive studies to achieve the above object. As a result, the present inventors have found that the object is achieved with an acrylic rubber graft copolymer obtained by polymerizing a vinyl monomer to a rubbery polymer which includes acrylate ester monomer units and is produced using specific polyfunctional monomers in combination with the acrylate ester monomer.

The present invention has been accomplished based on the above finding and is summarized as follows.

[1] An acrylic rubber graft copolymer obtained by graft polymerizing a vinyl monomer in the presence of a rubbery polymer including acrylate ester monomer units and polyfunctional monomer units, wherein the total amount of the polyfunctional monomer units in the rubbery polymer is 0.3 to 3 parts by mass with respect to 100 parts by mass of the acrylate ester monomer units, and the polyfunctional monomer units include 30 to 95 mass % of polyfunctional monomer units having two unsaturated bonds and 5 to 70 mass % of polyfunctional monomer units having three unsaturated bonds with respect to 100 mass % of the total of the polyfunctional monomer units.

[2] The acrylic rubber graft copolymer described in [1], wherein the rubbery polymer is a polymer obtained by mixing a copolymer latex obtained by polymerizing a monomer mixture including an acrylate ester monomer and polyfunctional monomers together with an acid group-containing copolymer latex to enlarge the polymer, and thereafter further adding a monomer including an acrylate ester monomer and polymerizing the monomer to the enlarged polymer.

[3] The acrylic rubber graft copolymer described in [1] or [2], wherein the rubbery polymer has a volume average particle diameter of 300 to 600 nm.

[4] A thermoplastic resin composition including the acrylic rubber graft copolymer described in any of [1] to [3] (hereinafter, referred to as "acrylic rubber graft copolymer (A)").

[5] The thermoplastic resin composition described in [4], wherein the thermoplastic resin composition includes the acrylic rubber graft copolymer (A) and an acrylic rubber graft copolymer having a volume average particle diameter of 70 to 200 nm and obtained by graft polymerizing a vinyl monomer in the presence of a rubbery polymer including acrylate ester monomer units (hereinafter, referred to as "acrylic rubber graft copolymer (B)").

[6] The thermoplastic resin composition described in [5], wherein the thermoplastic resin composition includes the rubbery polymers in a total amount of 5 to 30 parts by mass with respect to 100 parts by mass of resin components in the thermoplastic resin composition and wherein the amount of the rubbery polymer in the acrylic rubber graft copolymer (A) is 20 to 70 mass % and the amount of the rubbery polymer in the acrylic rubber graft copolymer (B) is 30 to 80 mass % with respect to the total of the rubbery polymers in the thermoplastic resin composition taken as 100 mass %.

[7] The thermoplastic resin composition described in [5] or [6], which includes 0 to 90 parts by mass of an additional thermoplastic resin (C) other than the acrylic rubber graft copolymer (A) and the acrylic rubber graft copolymer (B).

[8] The thermoplastic resin composition described in any of [5] to [7], wherein the acrylic rubber graft copolymer (B) is a polymer obtained in such a manner that 100 mass % of an acrylate ester monomer is polymerized at a polymerization rate of not less than 3 mass %/min.

[9] A thermoplastic resin shaped article obtained by shaping the thermoplastic resin composition described in any of [4] to [8].

Advantageous Effects of Invention

The acrylic rubber graft copolymers and the thermoplastic resin compositions according to the present invention are excellent in impact resistance, rigidity and appearance as well as in the balance of these properties, and further exhibit excellent weather resistance. Thus, these materials are highly valuable in industry and may be utilized in automobile materials, building materials and home appliance materials which are recently in growing demand.

DESCRIPTION OF EMBODIMENTS

Hereinbelow, embodiments of the invention will be described in detail.

In the present specification, the term "unit" indicates a structural part derived from a monomer compound (a monomer) before polymerization. For example, an "acrylate ester monomer unit" means a "structural part derived from an acrylate ester monomer".

In the specification, the term "(meth)acryl" means either or both of "acryl" and "methacryl".

[Acrylic Rubber Graft Copolymers (A)]

An acrylic rubber graft copolymer of the invention (an acrylic rubber graft copolymer (A)) is a graft copolymer obtained by graft polymerizing a vinyl monomer in the presence of a rubbery polymer including acrylate ester monomer units and polyfunctional monomer units. The total amount of the polyfunctional monomer units in the rubbery polymer is 0.3 to 3 parts by mass with respect to 100 parts by mass of the acrylate ester monomer units. The polyfunctional monomer units include 30 to 95 mass % of polyfunctional monomer units having two unsaturated bonds and 5 to 70 mass % of polyfunctional monomer units having three unsaturated bonds with respect to 100 mass % of the total of the polyfunctional monomer units.

The rubbery polymer used in the inventive acrylic rubber graft copolymer (A) (hereinafter, sometimes referred to as "rubbery polymer (a)") includes acrylate ester monomer units and polyfunctional monomer units as essential components.

The acrylate ester monomers are desirably alkyl acrylate esters having an alkyl group with 1 to 12 carbon atoms. Esters of acrylic acid and linear or branched alcohols with 1 to 12 carbon atoms are used as such alkyl acrylate esters. Examples include methyl acrylate, ethyl acrylate, propyl acrylate, n-butyl acrylate, isobutyl acrylate, t-butyl acrylate and 2-ethylhexyl acrylate. In particular, those having an alkyl group with 1 to 8 carbon atoms are preferable. These esters may be used singly, or two or more may be used in combination.

With respect to 100 mass % of the rubbery polymer (a), the content of the acrylate ester monomer units is preferably not less than 75 mass %, more preferably not less than 85 mass %, and particularly preferably not less than 95 mass %. If the content of the acrylate ester monomer units is less than the lower limit, the obtainable acrylic rubber graft copolymer (A) and the obtainable thermoplastic resin composition may be deteriorated in any of weather resistance, impact resistance, rigidity and appearance.

In the rubbery polymer (a), the total content of the polyfunctional monomer units is 0.3 to 3 parts by mass with respect to 100 parts by mass of the acrylate ester monomer units, and is preferably not more than 2 parts by mass, particularly preferably not more than 1.5 parts by mass, and is preferably not less than 0.4 parts by mass, particularly preferably not less than 0.5 parts by mass. If the content of the polyfunctional monomer units exceeds the upper limit, the obtainable acrylic rubber graft copolymer (A) and the obtainable thermoplastic resin composition may be deteriorated in impact resistance. Any content below the lower limit may result in a decrease in appearance.

The polyfunctional monomer units include polyfunctional monomer units having two unsaturated bonds, and polyfunctional monomer units having three unsaturated bonds. With respect to the total of the polyfunctional monomer units in the rubbery polymer (a) taken as 100 mass %, the proportion of the polyfunctional monomer units having two unsaturated bonds is 30 to 95 mass % and that of the polyfunctional monomer units having three unsaturated bonds is 5 to 70 mass %. The proportion of the polyfunctional monomer units having two unsaturated bonds is more preferably not less than 35 mass % and that of the polyfunctional monomer units having three unsaturated bonds is more preferably not more than 65 mass %; and the proportion of the polyfunctional monomer units having two unsaturated bonds is particularly preferably not less than 40 mass % and that of the polyfunctional monomer units having three unsaturated bonds is particularly preferably not more than 60 mass %. Further, the proportion of the polyfunctional monomer units having two unsaturated bonds is preferably not more than 90 mass % and that of the polyfunctional monomer units having three unsaturated bonds is preferably not less than 10 mass %; and the proportion of the polyfunctional monomer units having two unsaturated bonds is particularly preferably not more than 80 mass % and that of the polyfunctional monomer units having three unsaturated bonds is particularly preferably not less than 20 mass %.

If the proportion of the polyfunctional monomer units having two unsaturated bonds is less than the lower limit and that of the polyfunctional monomer units having three unsaturated bonds is in excess of the upper limit, the obtainable acrylic rubber graft copolymer (A) and the obtainable thermoplastic resin composition may be deteriorated in appearance. If the proportion of the polyfunctional monomer units having two unsaturated bonds is in excess of the upper limit and that of the polyfunctional monomer units having three unsaturated bonds is less than the lower limit, the obtainable acrylic rubber graft copolymer (A) and the obtainable thermoplastic resin composition may be deteriorated in impact strength and rigidity.

Examples of the polyfunctional monomers having two unsaturated bonds according to the invention include allyl methacrylate, di(meth)acrylate esters of diols such as ethylene glycol dimethacrylate, 1,3-butanediol dimethacrylate and 1,6-hexanediol diacrylate, 2-propenyl acrylate and divinylbenzene. In particular, those having an allyl group such as allyl methacrylate and 2-propenyl acrylate are preferable. Allyl methacrylate is particularly preferable in terms of the efficiency in improvements of properties of the obtainable resin compositions.

Examples of the polyfunctional monomers having three or more unsaturated bonds include those having an aromatic ring such as triallyl isocyanurate, triallyl cyanurate and triallyl trimellitate. In particular, triallyl isocyanurate and triallyl cyanurate having a triazine ring are preferable. In terms of polymerization stability, triallyl isocyanurate is particularly preferable.

These polyfunctional monomers having two unsaturated bonds, and these polyfunctional monomers having three unsaturated bonds may each be used singly or as a mixture including two or more kinds of monomers.

In addition to the acrylate ester monomer and the polyfunctional monomers, the rubbery polymer (a) may include an additional monomer copolymerizable with the acrylate ester monomer as required.

Examples of the additional monomers copolymerizable with the acrylate ester monomers include aromatic vinyl monomers such as styrene, α-methylstyrene and p-methylstyrene, unsaturated nitrile monomers such as acrylonitrile and methacrylonitrile, and methacrylate ester monomers such as methyl methacrylate, ethyl methacrylate, propyl methacrylate, n-butyl methacrylate, isobutyl methacrylate, t-butyl methacrylate and 2-ethylhexyl methacrylate. These monomers may be used singly, or two or more may be used in combination.

Further, the rubbery polymer (a) may be a composite rubber formed between a rubbery polymer including acrylate ester monomer units and polyfunctional monomer units, and a rubbery polymer composed of monomer units other than acrylate ester monomer units. In this case, the rubbery polymer composed of monomer units other than acrylate ester monomer units may be, for example, ethylene-propylene rubber (EPR), ethylene-propylene-diene rubber (EPDM), diene rubber or polyorganosiloxane. The composite rubber may be obtained by a known method, for example, by polymerizing an acrylate ester monomer and polyfunctional monomers in the presence of a rubbery polymer composed of monomer units other than acrylate ester monomer units, or by enlarging a rubbery polymer composed of a monomer other than acrylate ester monomers, together with a rubbery polymer including an acrylate ester monomer and polyfunctional monomers.

The rubbery polymer (a) according to the invention is preferably produced by emulsion polymerization of a mixture of the above monomers.

The emulsifier used in the emulsion polymerization is preferably an anionic emulsifier because it permits excellent stability of the latex during emulsion polymerization and allows for an increase in polymerization rate.

Examples of the anionic emulsifiers include carboxylate salts (such as sodium sarcosinate, fatty acid potassium, fatty acid sodium, dipotassium alkenylsuccinates and rosin acid soap), alkylsulfate ester salts, sodium alkylbenzenesulfonates, sodium alkylsulfosuccinates and polyoxyethylene nonylphenyl ether sodium sulfate esters. From viewpoints such as the suppression of hydrolysis of the polyfunctional monomers, such emulsifiers as sodium sarcosinate, dipotassium alkenylsuccinates, alkylsulfate ester salts, sodium alkylbenzenesulfonates, sodium alkylsulfosuccinates and polyoxyethylene nonylphenyl ether sodium sulfate esters are preferable. Of these, dipotassium alkenylsuccinates are particularly preferable from aspects such as polymerization stability.

These emulsifiers may be used singly, or two or more may be used as a mixture.

The rubbery polymer (a) used in the inventive acrylic rubber graft copolymer (A) is preferably produced by mixing a copolymer latex obtained by polymerizing a monomer mixture including an acrylate ester monomer and polyfunctional monomers, together with an acid group-containing copolymer latex to enlarge the polymer. It is more preferable that a condensed acid salt be added before the acid group-containing copolymer latex is mixed. The enlargement in the above manner makes it possible to obtain a rubbery polymer (a) having a desired volume average particle diameter. The addition of a condensed acid salt suppresses the rubbery polymer from being not more than 200 nm in particle diameter.

In the practice of the enlargement of the rubbery polymer (a), the condensed acid salt which is added before mixing of an acid group-containing copolymer latex is a salt of a condensed acid of an acid such as phosphoric acid or silicic acid with an alkali metal and/or an alkaline earth metal. A salt of pyrophosphoric acid, which is a condensed phosphoric acid, with an alkali metal is preferable. Sodium pyrophosphate or potassium pyrophosphate is particularly preferable. The amount of the condensed acid salt added is preferably 0.1 to 10 parts by mass, and more preferably 0.5 to 7 parts by mass with respect to 100 parts by mass (in terms of solid content) of the copolymer latex obtained by polymerizing a monomer mixture including an acrylate ester monomer and polyfunctional monomers. If the amount of the condensed acid salt added is less than the lower limit, the enlargement does not take place sufficiently. If the condensed acid salt is added in excess of the upper limit, the enlargement may not take place sufficiently, or the rubber latex may become unstable and large amounts of coagula may be formed.

The acid group-containing copolymer latex used in the enlargement is a latex of an acid group-containing copolymer obtained by polymerizing in water a monomer mixture including an acid group-containing monomer, an alkyl (meth)acrylate ester monomer and optionally an additional monomer copolymerizable with these monomers.

The acid group-containing monomer is preferably an unsaturated compound having a carboxyl group. Examples of such compounds include (meth)acrylic acid, itaconic acid and crotonic acid, with (meth)acrylic acid being particularly preferable. The acid group-containing monomers may be used singly, or two or more may be used in combination.

Examples of the alkyl(meth)acrylate ester monomers include esters of acrylic acid and/or methacrylic acid with alcohols having a linear or branched alkyl group with 1 to 12 carbon atoms, such as methyl acrylate, ethyl acrylate, propyl acrylate, n-butyl acrylate, isobutyl acrylate, t-butyl acrylate, 2-ethylhexyl acrylate, methyl methacrylate, ethyl methacrylate, propyl methacrylate, n-butyl methacrylate, isobutyl methacrylate, t-butyl methacrylate and 2-ethylhexyl methacrylate. Alkyl(meth)acrylate esters having an alkyl group with 1 to 8 carbon atoms are particularly preferable. The alkyl(meth)acrylate ester monomers may be used singly, or two or more may be used in combination.

The additional monomers are monomers which are copolymerizable with the acid group-containing monomers and the alkyl(meth)acrylate ester monomers and which are not acid group-containing monomers or alkyl(meth)acrylate ester monomers. Examples of the additional monomers include aromatic vinyl monomers (for example, styrene, α-methylstyrene and p-methylstyrene), unsaturated nitrile monomers (for example, acrylonitrile and methacrylonitrile), and compounds having two or more polymerizable functional groups (for example, allyl methacrylate, polyethylene glycol dimethacrylate ester, triallyl cyanurate, triallyl isocyanurate and triallyl trimellitate). The additional monomers may be used singly, or two or more may be used in combination.

The amounts of these polymerizable monomers used are such that with respect to 100 mass % of the acid group-containing copolymer latex, the proportion of the acid group-containing monomer units is preferably 5 to 40 mass %, more preferably 8 to 30 mass %, the proportion of the alkyl(meth)acrylate ester monomer units is preferably 60 to 95 mass %, more preferably 70 to 92 mass %, and the proportion of the additional copolymerizable monomer units is preferably 0 to 48 mass %, more preferably 0 to 30 mass %. If the proportion of the acid group-containing monomer units is less than the lower limit, there will be substantially no enlargement performance obtained. If the proportion of the acid group-containing monomer units exceeds the upper limit, large amounts of coagula will be formed during the production of the acid group-containing copolymer latex.

The acid group-containing copolymer latex may be produced by a common emulsion polymerization method.

The emulsion polymerization may involve one, or two or more kinds of known emulsifiers such as anionic emulsifiers selected from those emulsifiers including carboxylic acid emulsifiers such as alkali metal salts of oleic acid, palmitic acid, stearic acid and rosin acid, and alkali metal salts of alkenylsuccinic acids, as well as alkylsulfate esters, sodium alkylbenzenesulfonates, sodium alkylsulfosuccinates and polyoxyethylene nonylphenyl ether sodium sulfate esters.

The emulsifiers may be used in such a manner that the whole amount is added at an initial stage of polymerization or such that a portion thereof is used at an initial stage and the remaining portion is added intermittently or continuously during the polymerization. The amount of the emulsifiers and the manner in which they are used affect the particle diameter of the acid group-containing copolymer latex and thus affect the particle diameter of a latex of the rubbery polymer (a) enlarged in particle diameter. Thus, the emulsifiers need to be added in an appropriate amount and in an appropriate manner.

Polymerization initiators such as thermally decomposable initiators and redox initiators may be used in the polymerization. Examples of the thermally decomposable initiators include potassium persulfate, sodium persulfate and ammonium persulfate. Examples of the redox initiators include combinations of compounds such as organic peroxides represented by cumene hydroperoxide, sodium formaldehyde sulfoxylate and iron salts. These initiators may be used singly, or two or more may be used in combination.

In addition, chain transfer agents may be used in order to adjust the molecular weight, with examples including mercaptans such as t-dodecylmercaptan and n-octylmercaptan, terpinolene and α-methylstyrene dimer. Further, alkalis and acids may be added to adjust the pH, and electrolytes may be added as viscosity decreasing agents.

The acid group-containing copolymer latex is preferably added in an amount of 0.1 to 10 parts by mass (in terms of solid content), and more preferably 0.3 to 7 parts by mass with respect to 100 parts by mass (in terms of solid content) of the copolymer latex obtained by polymerizing a monomer mixture including an acrylate ester monomer and polyfunctional monomers. If the amount of the acid group-containing copolymer latex added is less than the lower limit, the enlargement does not proceed to a sufficient level and may result in the generation of large amounts of coagula. If the acid group-containing copolymer latex is added in excess of the upper limit, the pH of the enlarged latex tends to be lowered and the latex tends to become unstable.

When the condensed acid salt is added before the acid group-containing copolymer latex is added to the copolymer latex obtained by polymerizing a monomer mixture including an acrylate ester monomer and polyfunctional monomers, the pH of the mixture liquid is preferably not less than 7. If the pH is less than 7, the enlargement does not take place sufficiently. In order to obtain a pH of not less than 7, a general alkali compound such as sodium hydroxide or potassium hydroxide may be used.

The condensed acid salt is preferably added at once before mixing of the acid group-containing copolymer latex.

The acid group-containing copolymer latex is preferably added at once or intermittently dropwise.

During the enlargement, it is necessary to control stirring appropriately. Insufficient stirring causes local enlargement and consequently leaves non-enlarged rubbery polymer components. Excessive stirring destabilizes the enlarged latex and may result in the generation of large amounts of coagula. The temperature during the enlargement is preferably 20 to 90° C., and more preferably 30 to 80° C. If the temperature is outside this range, the enlargement may not take place sufficiently.

In the preparation of the rubbery polymer (a) used in the acrylic rubber graft copolymer (A) of the invention, it is preferable that a monomer including an acrylate ester monomer be supplementarily added after the enlargement with the acid group-containing copolymer latex and be polymerized to the enlarged polymer. By performing this operation, the appearance of the obtainable acrylic rubber graft copolymer (A) and the obtainable thermoplastic resin composition may be further improved.

The amount of the supplementary monomer including an acrylate ester monomer is preferably not more than 50 mass %, more preferably not more than 40 mass %, particularly preferably not more than 30 mass %, and is preferably not less than 5 mass %, more preferably not less than 10 mass %, particularly preferably not less than 15 mass % with respect to the total of the monomers including the acrylate ester monomer used in the production of the rubbery polymer (a) taken as 100 mass %. The supplementary addition of the monomer including an acrylate ester monomer in excess of the upper limit results in the formation of rubbery polymer with a particle diameter of not more than 200 nm and may result in a deterioration in impact resistance or appearance of the obtainable acrylic rubber graft copolymer (A) and the obtainable thermoplastic resin composition. If the amount of the supplementary monomer including an acrylate ester monomer is less than the lower limit, the effects in the improvement of appearance become insufficient.

The supplementary monomer including an acrylate ester monomer may be added in any manner such as batch addition, portionwise addition or successive addition. Successive addition is more preferable in order to suppress a deterioration in impact resistance or appearance due to the formation of rubbery polymer with a particle diameter of not more than 200 nm.

Here, the monomer including an acrylate ester monomer is any of the acrylate ester monomers, the polyfunctional monomers and the aforementioned optional additional monomers copolymerizable with these monomers, and includes at least an acrylate ester monomer. That is, the monomer(s) may be an acrylate ester monomer alone or may be a mixture including an acrylate ester monomer and a polyfunctional monomer or a mixture including an acrylate ester monomer, a polyfunctional monomer and an additional monomer. A mixture including an acrylate ester monomer and a polyfunctional monomer is particularly preferable.

When the monomers including an acrylate ester monomer are supplementarily added, the polyfunctional monomers and the optional additional monomers used before and after the enlargement may be added with different proportions. That is, the polyfunctional monomers and the optional additional monomers used at the stage of polymerizing the supplementary monomers including an acrylate ester monomer after the enlargement may be added with different proportions from those of the polyfunctional monomers and the optional additional monomers used at the stage of polymerizing the monomers including an acrylate ester monomer before the enlargement. However, the total amount of the polyfunctional monomers and the optional additional monomers used at the completion of the polymerization for producing the rubbery polymer should be within the aforementioned range. The balance among impact resistance, rigidity and appearance of the obtainable acrylic rubber graft copolymer (A) and the obtainable thermoplastic resin composition tends to be improved by using relatively small amounts of polyfunctional monomers at the stage of polymerizing the monomers including an acrylate ester monomer before the enlargement and by using relatively large amounts of polyfunctional monomers at the stage of polymerizing the supplementary monomers including an acrylate ester monomer after the enlargement. In this case, provided that the proportion of the acrylate ester monomer used before the enlargement is X mass % relative to the total amount of the acrylate ester monomer taken as 100 mass %, the polyfunctional monomers used before the enlargement may be added in not more than X mass %, for example, 0.3× to X mass %, and the polyfunctional monomers used at the stage of polymerizing the supplementary monomers including an acrylate ester monomer after the enlargement may be added in not less than (100−X) mass %, for example, (100−X) to 2×(100−X) mass %, with respect to the total amount of the polyfunctional monomers taken as 100 mass %.

The rubbery polymer (a) used in the inventive acrylic rubber graft copolymer (A) preferably has a volume average particle diameter of not less than 300 nm, and more preferably not less than 350 nm. If the volume average particle diameter is less than the lower limit, the obtainable acrylic rubber graft copolymer (A) and the obtainable thermoplastic resin composition may exhibit low impact resistance. The volume average particle diameter of the rubbery polymer (a) is preferably not more than 600 nm, and more preferably not more than 550 nm. If the volume average particle diameter exceeds the upper limit, the obtainable acrylic rubber graft copolymer (A) and the obtainable thermoplastic resin composition may exhibit poor appearance.

It is preferable that the content of rubbery polymer having a particle diameter of not more than 200 nm be not more than 20 mass %, and more preferably not more than 10 mass % with respect to 100 mass % of the rubbery polymer (a). If the content of rubbery polymer having a particle diameter of not more than 200 nm exceeds the upper limit, the obtainable acrylic rubber graft copolymer (A) and the obtainable thermoplastic resin composition may exhibit low impact resistance.

The acrylic rubber graft copolymer (A) of the invention is obtained by graft polymerizing a vinyl monomer in the presence of the rubbery polymer (a).

The vinyl monomers used in the graft polymerization preferably include an unsaturated nitrile monomer and an aromatic vinyl monomer, and optionally an additional monomer as required.

Examples of the unsaturated nitrile monomers include acrylonitrile and methacrylonitrile. These may be used singly, or two or more may be used in combination.

Examples of the aromatic vinyl monomers include styrene, α-methylstyrene and vinyltoluene. These may be used singly, or two or more may be used in combination.

The additional monomers are monomers which are copolymerizable with the unsaturated nitrile monomers and the aromatic vinyl monomers and which are not unsaturated nitrile monomers or aromatic vinyl monomers. Examples of the additional monomers include methyl methacrylate, ethyl methacrylate, n-butyl methacrylate, 2-ethylhexyl acrylate, methyl acrylate, ethyl acrylate, n-butyl acrylate, 2-hydroxyethyl methacrylate, glycidyl methacrylate, N,N-dimethylaminoethyl methacrylate, acrylamide, methacrylamide, maleic acid anhydride and N-substituted maleimide. The additional monomers may be used singly, or two or more may be used in combination.

The vinyl monomer that is graft polymerized to the rubbery polymer (a) is preferably a monomer mixture including an aromatic vinyl monomer such as styrene and an unsaturated nitrile monomer such as acrylonitrile because excellent impact resistance of the obtainable shaped articles is obtained. A mixture of styrene and acrylonitrile is particularly preferable.

In the mixture of monomers graft polymerized to the rubbery polymer (a), the proportion of unsaturated nitrile monomers is preferably 3 to 50 mass %, and more preferably 10 to 40 mass % in the monomer mixture (100 mass %). When the proportion of unsaturated nitrile monomers is not less than the lower limit, the obtainable shaped articles exhibit good impact resistance. When the proportion of unsaturated nitrile monomers is not more than the upper limit, the obtainable shaped articles are suppressed from discoloration due to heat.

The proportion of aromatic vinyl monomers is preferably 20 to 97 mass %, and more preferably 30 to 80 mass % in the monomer mixture (100 mass %). When the proportion of aromatic vinyl monomers is not less than the lower limit, good shaping properties are obtained. When the proportion of aromatic vinyl monomers is not more than the upper limit, the obtainable shaped articles exhibit good impact resistance.

In the monomer mixture (100 mass %), the proportion of additional monomers is preferably not more than 50 mass %, and more preferably not more than 40 mass %. When the proportion of additional monomers is not more than the upper limit, a good balance between impact resistance and appearance is obtained.

Preferably, the acrylic rubber graft copolymer (A) of the invention is produced by the emulsion polymerization of the above monomer mixture in the presence of the rubbery polymer (a) latex.

Similarly to the production of the rubbery polymer (a), the emulsifier used in the emulsion polymerization is preferably an anionic emulsifier. From viewpoints such as the suppression of hydrolysis of the polyfunctional monomers, dipotassium alkenylsuccinates are preferable.

Exemplary polymerization initiators used in the emulsion polymerization include peroxides, azo initiators, and redox initiators including combinations of oxidizing agents and reducing agents.

The emulsion polymerization may involve chain transfer agents in order to adjust the graft ratio and the molecular weights of grafted components.

In the emulsion polymerization, the monomers such as aromatic vinyl monomers and unsaturated nitrile monomers may be added by a method such as batch addition, portion-wise addition or successive addition. These methods may be used in combination such that, for example, a portion is added at once and the remaining portion is added successively. It is also possible to adopt a method in which the monomers are held for a time after they are added, and thereafter the polymerization initiator is added to initiate the polymerization.

After the emulsion polymerization, the acrylic rubber graft copolymer (A) may be recovered from the latex of the acrylic rubber graft copolymer (A) by the following method.

The graft copolymer latex is added to hot water in which a coagulant has been dissolved, thereby solidifying the graft copolymer. Next, the solidified graft copolymer is redispersed in water or warm water to give a slurry, and the copolymer is washed by eluting the residual emulsifier remaining in the graft copolymer into the water. Subsequently, the slurry is dehydrated with a device such as a dehydrator and the resultant solid is dried with a drier such as an airborne drier, thereby recovering the graft copolymer as a powder or particles.

In an embodiment, the acrylic rubber graft copolymer (A) latex may be mixed together with an acrylic rubber graft copolymer (B) latex described later and optionally with an additional polymer latex, and thereafter the copolymer may be recovered in the above manner.

Examples of the coagulants include inorganic acids (such as sulfuric acid, hydrochloric acid, phosphoric acid and nitric acid) and metal salts (such as calcium chloride, calcium acetate and aluminum sulfate). The coagulants are selected appropriately in accordance with the type of the emulsifier. For example, any coagulant may be used in the case where a carboxylate salt (such as a fatty acid salt or a rosin acid soap) alone is used as the emulsifier. An inorganic acid does not work sufficiently and a metal salt needs to be used in the case where the emulsifier is one which exhibits stable emulsifying power even in an acidic region such as sodium alkylbenzenesulfonate.

In the acrylic rubber graft copolymer (A), the content of the rubbery polymer (a) is preferably 10 to 90 parts by mass, more preferably 20 to 80 parts by mass, and particularly preferably 30 to 70 parts by mass with respect to 100 parts by mass of the acrylic rubber graft copolymer (A). When the content of the rubbery polymer (a) is not less than the lower limit, the obtainable acrylic rubber graft copolymer (A) and the obtainable thermoplastic resin composition achieve still higher impact resistance. When the content of the rubbery polymer (a) is not more than the upper limit, the obtainable acrylic rubber graft copolymer (A) and the obtainable thermoplastic resin composition can maintain good appearance.

The graft ratio of the acrylic rubber graft copolymer (A) is preferably 30 to 90%, and particularly preferably 50 to 80%. This range of the graft ratio of the acrylic rubber graft copolymer (A) ensures that good appearance is maintained. The graft ratio of the acrylic rubber graft copolymer (A) may be determined by a method described later in EXAMPLES.

Further, it is preferable that the reduced viscosity of acetone-soluble acrylic rubber graft copolymer (A) components be 0.40 to 1.00 g/dL, and particularly preferably 0.50 to 0.80 g/dL. The impact strength can be further increased when the reduced viscosity of acetone-soluble acrylic rubber graft copolymer (A) components is not less than the lower limit. When the reduced viscosity is not more than the upper limit, good appearance and shaping properties can be maintained. The reduced viscosity of acetone-soluble acrylic rubber graft copolymer (A) components may be determined by a method described later in EXAMPLES.

[Thermoplastic Resin Compositions]

A thermoplastic resin composition according to the present invention includes the inventive acrylic rubber graft copolymer (A) described above. Preferably, the thermoplastic resin composition includes the inventive acrylic rubber graft copolymer (A) and an acrylic rubber graft copolymer (B) which is obtained by polymerizing a vinyl monomer in the presence of a rubbery polymer including acrylate ester monomer units (hereinafter, sometimes referred to as "rubbery polymer (b)") and which has a volume average particle diameter of 70 to 200 nm (hereinafter, sometimes referred to as "acrylic rubber graft copolymer (B) of the invention").

The rubbery polymer (b) used in the acrylic rubber graft copolymer (B) of the invention includes acrylate ester monomer units as essential components.

The acrylate ester monomers are desirably alkyl acrylate esters having an alkyl group with 1 to 12 carbon atoms. Esters of acrylic acid and linear or branched alcohols with 1 to 12 carbon atoms are used as such alkyl acrylate esters. Examples include methyl acrylate, ethyl acrylate, propyl acrylate, n-butyl acrylate, isobutyl acrylate, t-butyl acrylate and 2-ethylhexyl acrylate. In particular, those having an alkyl group with 1 to 8 carbon atoms are preferable. These esters may be used singly, or two or more may be used in combination.

The rubbery polymer (b) may include polyfunctional monomer units in addition to the acrylate ester monomer units. In such cases, the polyfunctional monomers used in the rubbery polymer (b) are not particularly limited and may be any of known polyfunctional monomers. Examples of such known polyfunctional monomers include di(meth)acrylate esters of diols such as ethylene glycol dimethacrylate, 1,3-butanediol dimethacrylate and 1,6-hexanediol diacrylate, as well as triallyl cyanurate, triallyl isocyanurate, triallyl trimellitate and allyl methacrylate. These may be used singly, or two or more may be used in combination.

Further, the rubbery polymer (b) may include an additional monomer as required which is copolymerizable with the acrylate ester monomers. Examples of the additional monomers copolymerizable with the acrylate ester monomers include aromatic vinyl monomers such as styrene, α-methylstyrene and p-methylstyrene, unsaturated nitrile monomers such as acrylonitrile and methacrylonitrile, and methacrylate ester monomers such as methyl methacrylate, ethyl methacrylate, propyl methacrylate, n-butyl methacrylate, isobutyl methacrylate, t-butyl methacrylate and 2-ethylhexyl methacrylate. These monomers may be used singly, or two or more may be used in combination.

Further, the rubbery polymer (b) used in the inventive acrylic rubber graft copolymer (B) may be a composite rubber formed between a rubbery polymer including acrylate ester monomer units, and a rubbery polymer composed of monomer units other than acrylate ester monomer units. For example, the rubbery polymer composed of monomer units other than acrylate ester monomer units may be ethylene-propylene rubber (EPR), ethylene-propylene-diene rubber (EPDM), diene rubber or polyorganosiloxane. The composite rubber may be obtained by a known method, for example, by polymerizing an acrylate ester monomer in the presence of a rubbery polymer composed of monomer units other than acrylate ester monomer units.

With respect to 100 mass % of the rubbery polymer (b), the content of the acrylate ester monomer units is preferably not less than 75 mass %, more preferably not less than 85 mass %, and particularly preferably not less than 95 mass %. If the content of the acrylate ester monomer units is less than the lower limit, the obtainable thermoplastic resin composition may be deteriorated in any of weather resistance, impact resistance, rigidity and appearance.

In the rubbery polymer (b), the content of the polyfunctional monomer units is preferably not more than 3 parts by mass, more preferably not more than 2 parts by mass, particularly preferably not more than 1 part by mass and is preferably not less than 0.05 parts by mass, more preferably not less than 0.1 part by mass, particularly preferably not less than 0.15 parts by mass, with respect to 100 parts by mass of the acrylate ester monomer units. If the content of the polyfunctional monomer units in the rubbery polymer (b) exceeds the upper limit, the obtainable thermoplastic resin composition may be deteriorated in impact resistance. Any content below the lower limit may result in a decrease in appearance.

In the case where the rubbery polymer (b) includes units from additional monomers copolymerizable with acrylate ester monomers, the content thereof in the rubbery polymer (b) is preferably not more than 25 mass %, more preferably not more than 15 mass %, and particularly preferably not more than 5 mass %. If the content of the additional monomer units exceeds the upper limit, the obtainable thermoplastic resin composition may be deteriorated in any of weather resistance, impact resistance, rigidity and appearance.

A latex of the rubbery polymer (b) for the acrylic rubber graft copolymer (B) is preferably produced by emulsion polymerization. In particular, it is preferable that the latex be produced by a batchwise emulsion polymerization method with batchwise addition of the acrylate ester monomer in such a manner that 100 mass % of the whole of the acrylate ester monomer used in the production of the rubbery polymer (b) is polymerized at a polymerization rate of not less than 3 mass %/min, and particularly not less than 3.5 mass %/min. If the polymerization rate is less than the lower limit, the appearance of the obtainable thermoplastic resin composition may be deteriorated. The upper limit of the polymerization rate is not particularly limited. In industrial production, however, the removal of the polymerization heat is more difficult as the polymerization rate increases. Thus, the polymerization rate is usually not more than 20 mass %/min, and more preferably not more than 10 mass %/min.

Because a structural analysis in detail of the rubbery polymer (b) is impossible, detailed reasons are unknown why the above polymerization rate provides an improvement in appearance. However, it is probable that a change occurs in the crosslink structure of the rubbery polymer (b).

Redox initiators including combinations of oxidizing agents and reducing agents are preferable as the polymerization initiators used in the emulsion polymerization. The use of thermally decomposable initiators such as peroxides and azo initiators is disadvantageous in industry because large amounts of initiators need to be used in order to control the polymerization rate within the above range as well as because the polymerization entails high temperatures. When a redox initiator is used, the polymerization rate may be adjusted by controlling the amount of metal ions as a catalyst as well as the amounts of the oxidizing agent and the reducing agent.

The rubbery polymer (b) used in the acrylic rubber graft copolymer (B) preferably has a volume average particle diameter of not less than 70 nm, more preferably not less than 80 nm, and not more than 200 nm, more preferably not more than 170 nm, particularly preferably not more than 150 nm. If the volume average particle diameter of the rubbery polymer (b) is less than the lower limit, the obtainable thermoplastic resin composition may be deteriorated in mechanical strength. If the volume average particle diameter exceeds the upper limit, the appearance may be deteriorated.

The acrylic rubber graft copolymer (B) is obtained by graft polymerizing a vinyl monomer in the presence of the rubbery polymer (b).

The vinyl monomers used herein may be similar to the vinyl monomers used in the acrylic rubber graft copolymer (A). Preferred examples and amounts of the vinyl monomers are also similar to those described above.

The acrylic rubber graft copolymer (B) may be produced by a known production method such as emulsion polymerization or continuous polymerization. Of such methods, an emulsion polymerization method is particularly preferable. The agents used in the emulsion polymerization such as emulsifiers, initiators and chain transfer agents may be known agents similar to those used in the production of the acrylic rubber graft copolymer (A).

After the emulsion polymerization, the acrylic rubber graft copolymer (B) may be recovered from the latex of the acrylic rubber graft copolymer (B) by the same method as the recovery of the acrylic rubber graft copolymer (A).

As already described above, the acrylic rubber graft copolymer (A) latex, the acrylic rubber graft copolymer (B) latex and optionally an additional polymer latex may be mixed together, and thereafter the copolymer may be recovered in the above manner.

In the acrylic rubber graft copolymer (B), the content of the rubbery polymer (b) is preferably 10 to 90 parts by mass, more preferably 20 to 80 parts by mass, and particularly preferably 30 to 70 parts by mass with respect to 100 parts by mass of the acrylic rubber graft copolymer (B). When the content of the rubbery polymer (b) is not less than the lower limit, the obtainable thermoplastic resin composition achieves still higher impact resistance. When the content of the rubbery polymer is not more than the upper limit, the obtainable thermoplastic resin composition can maintain good appearance.

The graft ratio of the acrylic rubber graft copolymer (B) is preferably 30 to 90%, and particularly preferably 35 to 70%. This range of the graft ratio of the acrylic rubber graft copolymer (B) ensures that good appearance is maintained. The graft ratio of the acrylic rubber graft copolymer (B) may be determined by a method described later in EXAMPLES.

Further, it is preferable that the reduced viscosity of acetone-soluble acrylic rubber graft copolymer (B) components be 0.40 to 1.00 g/dL, and particularly preferably 0.50 to 0.80 g/dL. The impact strength can be further increased when the reduced viscosity of acetone-soluble acrylic rubber graft copolymer (B) components is not less than the lower limit. When the reduced viscosity is not more than the upper limit, good appearance and shaping properties can be maintained. The reduced viscosity of acetone-soluble acrylic rubber graft copolymer (B) components may be determined by a method described later in EXAMPLES.

[Thermoplastic Resins (C)]

The thermoplastic resin compositions of the invention may contain an additional thermoplastic resin (C) other than the acrylic rubber graft copolymers (A) and the acrylic rubber graft copolymers (B). In this case, examples of the thermoplastic resins (C) include styrene resins, methyl methacrylate-styrene copolymers (MS resins), (meth)acrylic resins, polymethyl methacrylates, polycarbonates (PC), polybutylene terephthalates (PBT), polyethylene terephthalates (PET), polyvinyl chlorides, polyolefins such as polyethylenes and polypropylenes, styrene elastomers such as styrene-butadiene-styrene (SBS), styrene-butadiene (SBR), hydrogenated SBS and styrene-isoprene-styrene (SIS), olefin elastomers, polyester elastomers, polyacetals, modified polyphenylene ethers (modified PPE resins), ethylene-vinyl acetate copolymers, polyphenylene sulfides (PPS), polyethersulfones (PES), polyetheretherketones (PEEK), polyallylates, liquid crystal polyester resins and polyamides (nylons). These thermoplastic resins may be used singly, or two or more may be used in combination.

Of these resins, polybutylene terephthalates (PBT) are preferable from the viewpoint of an improvement in chemical resistance; polyethylene terephthalates (PET) and styrene resins are preferable from the viewpoint of an improvement in shaping workability; and modified polyphenylene ethers (modified PPE) and polyamides are preferable from the viewpoint of an improvement in heat resistance. In terms of the balance between impact resistance and shaping properties, styrene resins are particularly preferable. From the viewpoint of an improvement in weather resistance, (meth) acrylic resins are particularly preferable. In terms of the balance between impact resistance and heat resistance, polycarbonate resins are particularly preferable.

The styrene resins are resins which contain aromatic vinyl monomer units as essential components and optional comonomers, for example, unsaturated nitrile monomers such as vinyl cyanide, unsaturated carboxylic acid anhydrides and N-substituted maleimides. These monomer units may be used singly, or two or more kinds may be used in combination.

Particularly preferred styrene resins are acrylonitrile-styrene copolymers, acrylonitrile-alpha-methylstyrene copolymers, acrylonitrile-styrene-N-phenylmaleimide copolymers, acrylonitrile-styrene-alpha-methylstyrene-N-phenylmaleimide copolymers and styrene-N-phenylmaleimide copolymers.

In the styrene resin, the proportion of aromatic vinyl monomer units is preferably 20 to 100 mass %, more preferably 30 to 90 mass %, and particularly preferably 50 to 80 mass % with respect to the monomer mixture (100 mass %) used in the production of the styrene resin. When the proportion of aromatic vinyl monomers is not less than the lower limit, the obtainable thermoplastic resin composition exhibits good shaping properties.

In the styrene resin, the proportion of unsaturated nitrile monomer units is preferably 0 to 50 mass %, and more preferably 10 to 40 mass % with respect to the monomer mixture (100 mass %) used in the production of the styrene resin. When the proportion of unsaturated nitrile monomers is less than the upper limit, the obtainable shaped articles are suppressed from discoloration due to heat.

In the styrene resin, the proportion of comonomers is preferably not more than 55 mass %, and more preferably not more than 40 mass % with respect to the monomer mixture (100 mass %) used in the production of the styrene resin. When the proportion of comonomers is not more than the upper limit, the obtainable shaped articles exhibit a good balance between impact resistance and appearance.

The (meth)acrylic resins are resins that are composed of polymer components formed of methacrylate ester monomers such as methyl methacrylate, or copolymer components formed of methacrylate ester monomers as well as acrylate ester monomers such as methyl acrylate and/or additional monomers copolymerizable with methacrylate ester monomers and acrylate ester monomers. In the (meth) acrylic resin, the mass ratio of the methacrylate ester monomer to the acrylate ester monomer is preferably in the range of 100/0 to 50/50, and more preferably 99/1 to 80/20. If the ratio of the acrylate ester monomer is higher than this range, the obtainable thermoplastic resin composition tends to be deteriorated in thermal stability and heat resistance.

It is preferable that methyl methacrylate be used as the methacrylate ester monomer and methyl acrylate be used as the acrylate ester monomer.

Specific examples of the (meth)acrylic resins include commercially available "ACRYPET VHS" and "ACRYPET MD" manufactured by Mitsubishi Rayon Co., Ltd., and "PARAPET G" manufactured by KURARAY CO., LTD.

The polycarbonate resins (PC) preferably have a viscosity average molecular weight (Mv) in the range of 10,000 to 45,000, and particularly preferably 13,000 to 40,000. If the viscosity average molecular weight of the polycarbonate resin is lower than this range, the impact resistance tends to be deteriorated. If the viscosity average molecular weight exceeds this range, the fluidity is deteriorated to cause poor shaping properties and the appearance of the products tends to be inferior.

Specific examples of the polycarbonate resins (PC) include commercially available "Iupilon series" and "NOVAREX series" manufactured by Mitsubishi Engineering-Plastics Corporation and "TARFLON series" manufactured by Idemitsu Kosan Co., Ltd.

The additional thermoplastic resins (C) may be produced by known production methods such as emulsion polymerization, suspension polymerization and continuous bulk polymerization.

[Resin Components]

As the resin components, the thermoplastic resin composition of the invention essentially contains the acrylic rubber graft copolymer (A) and preferably further contains the acrylic rubber graft copolymer (B) and optionally the additional thermoplastic resin (C).

The thermoplastic resin composition of the invention preferably includes the rubbery polymers in a total amount of 5 to 30 parts by mass, and more preferably 7 to 25 parts by mass with respect to 100 parts by mass of the resin components in the thermoplastic resin composition. When the content of the rubbery polymers in the thermoplastic resin composition is not less than the lower limit, the impact resistance of the obtainable thermoplastic resin composition is further increased. When the content of the rubbery polymers is not more than the upper limit, the obtainable thermoplastic resin composition can maintain good appearance and fluidity.

In the thermoplastic resin composition of the invention, it is preferable that the amount of the rubbery polymer (a) in the acrylic rubber graft copolymer (A) be 20 to 70 mass % and the amount of the rubbery polymer (b) in the acrylic rubber graft copolymer (B) be 30 to 80 mass % with respect to the total of the rubbery polymers in the thermoplastic resin composition taken as 100 mass %. More preferably, the amount of the rubbery polymer (a) in the acrylic rubber graft copolymer (A) is 30 to 60 mass % and the amount of the rubbery polymer (b) in the acrylic rubber graft copolymer (B) is 40 to 70 mass %. The impact resistance of the obtainable thermoplastic resin composition is further increased when the amount of the rubbery polymer (a) in the acrylic rubber graft copolymer (A) is not less than the lower limit and the amount of the rubbery polymer (b) in the acrylic rubber graft copolymer (B) is not more than the upper limit. The obtainable thermoplastic resin composition can maintain good appearance when the amount of the rubbery polymer (a) in the acrylic rubber graft copolymer (A) is not more than the upper limit and the amount of the rubbery polymer (b) in the acrylic rubber graft copolymer (B) is not less than the lower limit.

When the thermoplastic resin composition including the acrylic rubber graft copolymer of the invention further contains the additional thermoplastic resin (C), the content thereof is preferably 0 to 70 parts by mass, and more preferably 10 to 65 parts by mass with respect to 100 parts by mass of the resin components in the thermoplastic resin composition. A good appearance can be maintained when the amount of the additional thermoplastic resin (C) used is not more than the upper limit.

[Additional Components]

The thermoplastic resin compositions of the invention may contain additional components as required such as colorants including pigments and dyes, heat stabilizers, light stabilizers, reinforcing agents, fillers, flame retardants, foaming agents, lubricants, plasticizers, antistatic agents and processing aids.

[Production Method of Thermoplastic Resin Compositions]

For example, the thermoplastic resin composition of the invention is produced by mixing the acrylic rubber graft copolymer (A) with the acrylic rubber graft copolymer (B) and optionally with the additional thermoplastic resin (C) and the additional components by the use of a mixer such as a twin-cylinder blender or a Henschel mixer, and melt-kneading the mixture discharged from the mixer. The mixture may be melt-kneaded with a kneader such as a single-screw or twin-screw extruder, a Banbury mixer, a heating kneader or rolls.

[Thermoplastic Resin Shaped Articles]

Thermoplastic resin shaped articles of the invention which are produced by shaping the inventive thermoplastic resin compositions may be used in various applications.

Examples of the methods for shaping the thermoplastic resin compositions include injection molding, extrusion, blow molding, compression molding, calendering and blown film extrusion.

The inventive thermoplastic resin composition may be used as a material for forming a coating layer on substrates such as other resins or metals.

In this case, examples of other resins forming the substrates on which a coating layer of the inventive thermoplastic resin composition is to be provided include resins described above as the additional thermoplastic resins (C), rubber-modified thermoplastic resins such as ABS resins and high-impact polystyrene resins (HIPS), and thermosetting resins such as phenolic resins and melamine resins.

By coating such resinous or metallic substrates with the inventive thermoplastic resin composition, designs resistant to weathering and having good appearance may be produced.

The shaped articles may be utilized in various applications. For example, the shaped articles may be suitably used in industry as vehicle parts, in particular various exterior and interior parts used without painting, building parts such as wall materials and window frames, eating utensils, toys, home electronics parts such as vacuum cleaner housings, television housings and air conditioner housings, interior parts, marine vessel parts, and electrical equipment housings such as communication device housings, notebook computer housings, mobile terminal housings and liquid crystal projector housings.

EXAMPLES

The present invention will be described in further detail by way of examples. However, the scope of the invention is not limited by such examples. In the following examples, the term "part(s)" is by mass unless otherwise mentioned.

Properties of rubbery polymers and acrylic rubber graft copolymers, and characteristics of shaped articles obtained were measured and evaluated by the following methods.

<Solid Content>

Exactly 1 g of a latex was weighed. Volatile components were evaporated at 200° C. over a period of 20 minutes, and the mass of the residue was measured. The solid content in the latex was determined from the following equation.

Solid content (%)=mass of residue/mass of latex×100

<Polymerization Conversion>

After the measurement of the solid content, the polymerization conversion was determined from the following equation.

Polymerization conversion (%)={S÷100×total mass of materials−mass of materials other than monomers and water}/total mass of monomers×100

In the equation, S is the solid content (%), and the total mass of materials is the total mass of materials such as monomers and water added to the reactor.

<Graft Ratio>

The graft ratio of a graft copolymer was calculated by the following method.

Acetone 80 mL was added to 2.5 g of the graft copolymer, and the mixture was refluxed in a hot water bath at 65° C. for 3 hours to extract acetone-soluble components. The residual acetone-insoluble components were separated by centrifugal separation and were dried. The dry weight was measured, and the mass proportion of the acetone-insoluble components in the graft copolymer was calculated. The graft ratio was calculated from the following equation based on the mass proportion of the acetone-insoluble components in the graft copolymer.

Graft ratio (%)=(mass proportion of acetone insoluble components−mass proportion of rubbery polymer)/mass proportion of rubbery polymer×100    [Math. 1]

<Reduced Viscosity>

The reduced viscosity was measured with respect to a 0.2 g/dL solution of a copolymer in N,N-dimethylformamide with an Ubbelohde viscometer at 25° C. The measurement of the reduced viscosity was performed using the acetone-soluble components of the graft copolymer which had been extracted in acetone in the measurement of the graft ratio.

<Viscosity Average Molecular Weight>

To determine the viscosity average molecular weight (Mv), a methylene chloride solution of a polycarbonate resin was analyzed with an Ubbelohde viscometer at 20° C. to measure the intrinsic viscosity [η]. The viscosity average molecular weight was calculated from the following equation.

$$[\eta]=1.23\times10^{-4}\times(Mv)^{0.83}$$

<Volume Average Particle Diameter, and Proportion of Particles with Particle Diameters of not More than 200 Nm>

These properties were determined by a dynamic light scattering method using Nanotrac UPA-EX150 manufactured by NIKKISO CO., LTD.

<Melt Volume Rate>

The melt volume rate of a thermoplastic resin composition was measured by a method in accordance with ISO 1133 at a barrel temperature of 220° C. and a load of 98 N. The melt volume rate is an indicator of the fluidity of a thermoplastic resin composition.

<Charpy Impact Strength>

The Charpy impact strength of a shaped article was measured by a method in accordance with ISO 179 with respect to a V-notched test piece which had been conditioned in an atmosphere at 23° C. for at least 12 hours.

<Flexural Modulus>

To determine the flexural modulus of a shaped article, a test piece with a thickness of 4 mm was tested by a method in accordance with ISO testing method 178 at a measurement temperature of 23° C.

<Deflection Temperature Under Load>

The deflection temperature under load of a shaped article was measured by a flatwise method with 1.83 MPa and 4 mm in accordance with ISO testing method 75.

<Gloss>

To determine the gloss of the surface of a shaped article, a thermoplastic resin composition was injection molded (injection rate: 40 g/sec.) into a 100 mm×100 mm×3 mm plate, and the gloss was obtained from the reflectance measured at an incident angle of 60° and a reflection angle of 60° with digital goniophotometer UGV-5D manufactured by Suga Test Instruments Co., Ltd.

In EXAMPLES 11 to 28 and COMPARATIVE EXAMPLES 3 to 5, the gloss was measured in the same manner as above with respect to the surface of 100×100×2 mm flat plate test pieces obtained by injection molding at an injection rate of 10 g/sec. or 40 g/sec.

<Color Production Properties>

A thermoplastic resin composition was injection molded (injection rate: 40 g/sec.) into a 100 mm×100 mm×3 mm plate, and L* was measured with colorimeter CM-508D manufactured by Minolta. A smaller L* value indicates better color production properties.

In EXAMPLES 11 to 28 and COMPARATIVE EXAMPLES 3 to 5, the color production properties were measured in the same manner as above with respect to the surface of 100×100×2 mm flat plate test pieces obtained by injection molding at an injection rate of 10 g/sec. or 40 g/sec.

Synthetic Example 1

Production of Acid Group-Containing Copolymer Latex (K)

Under a flow of nitrogen, a reactor equipped with a reagent injection container, a condenser tube, a jacket heater and a stirrer was charged with:
deionized water (hereinafter, simply water) 200 parts,
potassium oleate 2 parts,
sodium dioctylsulfosuccinate 4 parts,
ferrous sulfate heptahydrate 0.003 parts,
disodium ethylenediaminetetraacetate 0.009 parts, and
sodium formaldehyde sulfoxylate 0.3 parts. The temperature was increased to 60° C. When the temperature reached 60° C., a mixture consisting of:
n-butyl acrylate 82 parts,
methacrylic acid 18 parts, and
cumene hydroperoxide 0.5 parts, was continuously added dropwise over a period of 120 minutes. After the completion of the dropwise addition, aging was carried out at 60° C. for 2 hours. Thus, an acid group-containing copolymer latex (K) was obtained which had a solid content of 33%, a polymerization conversion of 96%, and a volume average particle diameter of the acid group-containing copolymer of 150 nm.

Synthetic Example 2

Production of Rubbery Polymer Latex (a-1)

<First Stage>

While performing stirring, a reactor equipped with a reagent injection container, a condenser tube, a jacket heater and a stirrer was charged with:
water 310 parts,
dipotassium alkenylsuccinate (LATEMUL ASK manufactured by Kao Corporation) 1 part,
n-butyl acrylate 80 parts,
allyl methacrylate 0.48 parts,
triallyl isocyanurate 0.4 parts, and
t-butyl hydroperoxide 0.2 parts. The reactor was then purged with nitrogen, and the temperature of the contents was increased. At an inside temperature of 55° C., an aqueous solution consisting of:
sodium formaldehyde sulfoxylate 0.3 parts,
ferrous sulfate heptahydrate 0.0001 part,
disodium ethylenediaminetetraacetate 0.0003 parts, and
water 10 parts, was added and the polymerization was initiated. After the generation of polymerization heat was observed, the jacket temperature was controlled to 75° C. The polymerization was continuously performed until the generation of polymerization heat ceased, and the system was allowed to stand for 1 hour. The obtained rubbery polymer had a volume average particle diameter of 100 nm. To the polymerization system, 1 part in terms of solid content of a 5% aqueous sodium pyrophosphate solution was added. (The pH of the mixture liquid was 9.1.) The jacket temperature was controlled so that the inside temperature became 70° C.

At an inside temperature of 70° C., the acid group-containing copolymer latex (K) was added in an amount of 3 parts in terms of solid content. The mixture was stirred for 30 minutes while maintaining the inside temperature at 70° C., thereby enlarging the particles. The volume average particle diameter after the enlargement was 420 nm.

<Second Stage>

At an inside temperature of 70° C., an aqueous solution consisting of:
sodium formaldehyde sulfoxylate 0.03 parts,
ferrous sulfate heptahydrate 0.002 parts,
disodium ethylenediaminetetraacetate 0.006 parts, and
water 80 parts, was added. Subsequently, a mixture liquid consisting of:
n-butyl acrylate 20 parts,
allyl methacrylate 0.12 parts,
triallyl isocyanurate 0.1 part, and
t-butyl hydroperoxide 0.02 parts, was added dropwise over a period of 1 hour. After the completion of the dropwise addition, the system was held at a temperature of 70° C. for 1 hour and was thereafter cooled. Thus, a rubbery polymer latex (a-1) was obtained which had a solid content of 18% and a volume average particle diameter of the rubbery polymer of 450 nm. The polymerization conversion was 97%, and the proportion of particles with particle diameters of not more than 200 nm was 10%.

Synthetic Example 3

Production of Rubbery Polymer Latexes (a-2) To (a-5) and Rubbery Polymer Latexes (x-1) to (x-2)

Rubbery polymer latexes (a-2) to (a-5) and rubbery polymer latexes (x-1) to (x-2) were obtained in the same manner as in SYNTHETIC EXAMPLE 2, except that allyl methacrylate and triallyl isocyanurate were used in the amounts described in Table 1.

Synthetic Example 4

Production of Rubbery Polymer Latex (a-6)

A rubbery polymer latex (a-6) was obtained in the same manner as in SYNTHETIC EXAMPLE 2, except that the 5% aqueous sodium pyrophosphate solution and the acid group-containing copolymer latex (K) were added in amounts of 2 parts and 3 parts in terms of solid content, respectively, at the enlargement. The volume average particle diameter after the enlargement was 510 nm. The volume average particle diameter after the polymerization of 20 parts of n-butyl acrylate was 550 nm.

Synthetic Example 5

Production of Rubbery Polymer Latex (a-7)

A rubbery polymer latex (a-7) was obtained in the same manner as in SYNTHETIC EXAMPLE 2, except that the 5% aqueous sodium pyrophosphate solution and the acid group-containing copolymer latex (K) were added in amounts of 1 part and 4 parts in terms of solid content, respectively, at the enlargement. The volume average particle diameter after the enlargement was 325 nm. The volume average particle diameter after the polymerization of 20 parts of n-butyl acrylate was 350 nm.

Synthetic Example 6

Production of Rubbery Polymer Latex (a-8)

A rubbery polymer latex (a-8) was obtained in the same manner as in SYNTHETIC EXAMPLE 2, except that the initial charge of materials such as monomers was changed as described in Table 1 and that the polymerization of monomers such as n-butyl acrylate after the enlargement was not carried out. The volume average particle diameter after the enlargement was 430 nm.

Synthetic Example 7

Production of Rubbery Polymer Latex (a-9)

A rubbery polymer latex (a-9) was obtained in the same manner as in SYNTHETIC EXAMPLE 2, except that the 5% aqueous sodium pyrophosphate solution and the acid group-containing copolymer latex (K) were added in amounts of 3 parts and 3 parts in terms of solid content, respectively, at the enlargement. The volume average particle diameter after the enlargement was 600 nm. The volume average particle diameter after the polymerization of 20 parts of n-butyl acrylate was 650 nm.

Synthetic Example 8

Production of Rubbery Polymer Latex (a-10)

A rubbery polymer latex (a-10) was obtained in the same manner as in SYNTHETIC EXAMPLE 2, except that the 5% aqueous sodium pyrophosphate solution and the acid group-containing copolymer latex (K) were added in amounts of 1 part and 5 parts in terms of solid content, respectively, at the enlargement. The volume average particle diameter after the enlargement was 280 nm. The volume average particle diameter after the polymerization of 20 parts of n-butyl acrylate was 300 nm.

The conditions for the synthesis of the rubbery polymer latexes (a-1) to (a-10) and (x-1) to (x-2), as well as properties such as particle diameters of the obtained rubbery polymers are described in Table 1.

TABLE 1

| | First stage | | | | | | Second Stage | | | | Rubbery polymer | | | |
|---|---|---|---|---|---|---|---|---|---|---|---|---|---|---|
| Rubbery polymer | BA (pts. by mass) | AMA (pts. by mass) | TAIC (pts. by mass) | BDMA (pts. by mass) | Vol. ave. part. diam. (nm) | Part. diam. after enl. (nm) | BA (pts. by mass) | AMA (pts. by mass) | TAIC (pts. by mass) | BDMA (pts. by mass) | Vol. ave. part. diam. (nm) | Prop. of 200 nm or finer particles (vol %) | Total amount of polyfunctional monomer units (*1) | AMA:TIAC ratio (mass %) (*2) |
| (a-1) | 80 | 0.48 | 0.40 | — | 100 | 420 | 20 | 0.12 | 0.10 | — | 450 | 10 | 1.10 | 54.5:45.5 |
| (a-2) | 80 | 0.96 | 0.08 | — | 100 | 420 | 20 | 0.24 | 0.02 | — | 450 | 9 | 1.30 | 92.3:7.7 |
| (a-3) | 80 | 0.24 | 0.40 | — | 100 | 420 | 20 | 0.06 | 0.10 | — | 450 | 8 | 0.80 | 37.5:62.5 |
| (a-4) | 80 | 0.96 | 0.40 | — | 100 | 420 | 20 | 0.24 | 0.10 | — | 450 | 10 | 1.70 | 70.6:29.4 |
| (a-5) | 80 | 0.24 | 0.08 | — | 100 | 420 | 20 | 0.06 | 0.02 | — | 450 | 7 | 0.40 | 75.0:25.0 |
| (a-6) | 80 | 0.48 | 0.40 | — | 100 | 510 | 20 | 0.12 | 0.10 | — | 550 | 4 | 1.10 | 54.5:45.5 |
| (a-7) | 80 | 0.48 | 0.40 | — | 100 | 325 | 20 | 0.12 | 0.10 | — | 350 | 18 | 1.10 | 54.5:45.5 |
| (a-8) | 100 | 0.48 | 0.50 | — | 100 | 430 | — | — | — | — | 430 | 5 | 0.98 | 49.0:51.0 |
| (a-9) | 80 | 0.48 | 0.40 | — | 100 | 600 | 20 | 0.12 | 0.10 | — | 650 | 1 | 1.10 | 54.5:45.5 |
| (a-10) | 80 | 0.48 | 0.40 | — | 100 | 280 | 20 | 0.12 | 0.10 | — | 300 | 29 | 1.10 | 54.5:45.5 |
| (x-1) | 80 | — | 0.40 | — | 100 | 420 | 20 | — | 0.10 | — | 450 | 8 | 0.50 | 0:100 |
| (x-2) | 80 | 0.24 | — | 0.08 | 100 | 420 | 20 | 0.06 | — | 0.02 | 450 | 10 | 0.40 | — |

BA: n-butyl acrylate
AMA: allyl methacrylate
TAIC: triallyl isocyanurate
BDMA: 1,3-butanediol dimethacrylate
(*1): parts by mass relative to 100 parts by mass of acrylate ester monomer
(*2): mass % relative to 100 mass % of the total amount of polyfunctional monomers Example 1

Production of Graft Copolymer (a-1)

A reactor equipped with a reagent injection container, a condenser tube, a jacket heater and a stirrer was charged with:
water (including the water in the rubbery polymer latex) 230 parts,
rubbery polymer latex (a-1) 50 parts (in terms of solid content),
dipotassium alkenylsuccinate (LATEMUL ASK manufactured by Kao Corporation) 0.5 parts, and sodium formaldehyde sulfoxylate 0.3 parts. The reactor was thoroughly purged with nitrogen. Thereafter, the inside temperature was increased to 70° C. while performing stirring.

Next, the temperature was raised to 80° C. while adding dropwise, over a period of 100 minutes, a mixture liquid consisting of:
  acrylonitrile 15 parts,
  styrene 35 parts, and
  t-butyl hydroperoxide 0.5 parts.

After the completion of the dropwise addition, the system was held at a temperature of 80° C. for 30 minutes, and was thereafter cooled. Thus, a graft copolymer (A-1) latex was obtained.

Subsequently, 100 parts of a 1.5% aqueous sulfuric acid solution was heated to 80° C., and 100 parts of the graft copolymer (A-1) latex was gradually added dropwise to the aqueous solution while stirring the aqueous solution, thereby solidifying the graft copolymer. Further, the temperature was increased to 95° C., and the system was held at the temperature for 10 minutes.

Next, the solid was dehydrated, washed and dried to give a powdery graft copolymer (A-1).

Examples 2 to 10 and Comparative Examples 1 to 2

Powdery graft copolymers (A-2) to (A-10) and (X-1) to (X-2) were obtained in the same manner as in EXAMPLE 1, except that the rubbery polymer latex was changed as described in Table 2.

The conditions for the synthesis of the graft copolymers (A-2) to (A-10) and (X-1) to (X-2), as well as the results of property evaluations are described in Table 2.

TABLE 2

| | Graft copolymer | Rubbery polymer | Graft ratio (%) | Reduced viscosity of acetone-soluble components (dL/g) |
| --- | --- | --- | --- | --- |
| EX. 1 | (A-1) | (a-1) | 52 | 0.69 |
| EX. 2 | (A-2) | (a-2) | 70 | 0.60 |
| EX. 3 | (A-3) | (a-3) | 45 | 0.76 |
| EX. 4 | (A-4) | (a-4) | 73 | 0.59 |
| EX. 5 | (A-5) | (a-5) | 41 | 0.79 |
| EX. 6 | (A-6) | (a-6) | 50 | 0.72 |
| EX. 7 | (A-7) | (a-7) | 54 | 0.68 |
| EX. 8 | (A-8) | (a-8) | 60 | 0.66 |
| EX. 9 | (A-9) | (a-9) | 50 | 0.72 |
| EX. 10 | (A-10) | (a-10) | 55 | 0.68 |
| COMP. EX. 1 | (X-1) | (x-1) | 34 | 0.85 |
| COMP. EX. 2 | (X-2) | (x-2) | 53 | 0.70 |

Synthetic Example 9

Production of Graft Copolymer (B-1)

While performing stirring, a reactor equipped with a reagent injection container, a condenser tube, a jacket heater and a stirrer was charged with:
  water 240 parts,
  dipotassium alkenylsuccinate (LATEMUL ASK manufactured by Kao Corporation) 0.7 parts,
  n-butyl acrylate 50 parts,
  allyl methacrylate 0.15 parts,
  1,3-butanediol dimethacrylate 0.05 parts, and
  t-butyl hydroperoxide 0.1 part. The reactor was then purged with nitrogen, and the temperature of the contents was increased.

At an inside temperature of 55° C., an aqueous solution consisting of:
  sodium formaldehyde sulfoxylate 0.2 parts,
  ferrous sulfate heptahydrate 0.00015 parts,
  disodium ethylenediaminetetraacetate 0.00045 parts, and
  water 10 parts, was added and the polymerization was initiated. After the generation of polymerization heat was observed, the jacket temperature was controlled to 75° C. The polymerization was continuously performed until the generation of polymerization heat ceased, and the system was allowed to stand for 1 hour. The generation of polymerization heat ceased in 20 minutes after observed. At the confirmation that the generation of heat had ceased, the polymerization conversion was 92% and the polymerization rate was 4.6%/min. The volume average particle diameter of the obtained rubbery polymer was 105 nm.

While controlling the inside temperature at 70° C., an aqueous solution consisting of:
  dipotassium alkenylsuccinate (LATEMUL ASK manufactured by Kao Corporation) 0.2 parts,
  sodium formaldehyde sulfoxylate 0.3 parts,
  ferrous sulfate heptahydrate 0.001 part,
  disodium ethylenediaminetetraacetate 0.003 parts, and
  water 10 parts, was added. Subsequently, the temperature was increased to 80° C. while adding dropwise, over a period of 80 minutes, a mixture liquid consisting of:
  acrylonitrile 12 parts,
  styrene 28 parts, and
  t-butyl hydroperoxide 0.2 parts.

After the completion of the dropwise addition, the system was held at a temperature of 80° C. for 30 minutes and was thereafter cooled to 75° C. Subsequently, a mixture liquid consisting of:
  acrylonitrile 3 parts,
  styrene 7 parts,
  normal-octylmercaptan 0.02 parts, and
  t-butyl hydroperoxide 0.05 parts, was added dropwise over a period of 20 minutes. After the completion of the dropwise addition, the system was held at a temperature of 75° C. for 60 minutes and was thereafter cooled. Thus, a graft copolymer (B-1) latex was obtained.

Subsequently, 100 parts of a 2.0% aqueous sulfuric acid solution was heated to 40° C., and 100 parts of the graft copolymer (B-1) latex was gradually added dropwise to the aqueous solution while stirring the aqueous solution, thereby solidifying the graft copolymer. Further, the temperature was increased to 95° C., and the system was held at the temperature for 10 minutes.

Next, the solid was dehydrated, washed and dried to give a powdery graft copolymer (B-1).

Synthetic Example 10

Production of Graft Copolymer (B-2)

A powdery graft copolymer (B-2) was obtained in the same manner as in SYNTHETIC EXAMPLE 9, except that the amount of dipotassium alkenylsuccinate added at the polymerization of n-butyl acrylate was changed to 0.3 parts.

The generation of heat by the polymerization of n-butyl acrylate ceased in 22 minutes after observed. At the confirmation that the generation of heat had ceased, the polymerization conversion was 94% and the polymerization rate was 4.3%/min. The volume average particle diameter of the rubbery polymer was 155 nm.

Synthetic Example 11

Production of Graft Copolymer (B-3)

A powdery graft copolymer (B-3) was obtained in the same manner as in SYNTHETIC EXAMPLE 9, except that the amounts of ferrous sulfate heptahydrate and disodium ethylenediaminetetraacetate added at the polymerization of n-butyl acrylate were changed to 0.0000375 parts and 0.0001125 parts, respectively.

The generation of heat by the polymerization of n-butyl acrylate ceased in 40 minutes after observed. At the confirmation that the generation of heat had ceased, the polymerization conversion was 91% and the polymerization rate was 2.3%/min. The volume average particle diameter was 130 nm.

The conditions for the synthesis of the graft copolymers (B-1) to (B-3), as well as the results of property evaluations are described in Table 3.

TABLE 3

| | Constituents of rubbery polymer | | | | |
|---|---|---|---|---|---|
| Graft copolymer | AMA (*1) (parts by mass) | BDMA (*1) (parts by mass) | Volume average particle diameter (nm) | Graft ratio (%) | Reduced viscosity of acetone-soluble components (dL/g) |
| (B-1) | 0.15 | 0.05 | 105 | 35 | 0.66 |
| (B-2) | 0.15 | 0.05 | 155 | 39 | 0.68 |
| (B-3) | 0.15 | 0.05 | 130 | 36 | 0.68 |

AMA: allyl methacrylate
BDMA: 1,3-butanediol dimethacrylate
(*1): parts by mass relative to 100 parts by mass of acrylate ester monomer Synthetic Example 12

Production of Thermoplastic Resins (C-1) and (C-2)

Copolymers (C-1) and (C-2) were obtained as thermoplastic resins (C-1) and (C-2) by a known suspension polymerization method. The chemical compositions and the reduced viscosities of the resins are described in Table 4.

Synthetic Example 13

Production of Thermoplastic Resin (C-3)

A copolymer (C-3) was obtained as a thermoplastic resin (C-3) by a known continuous solution polymerization method. The chemical composition and the reduced viscosity of the resin are described in Table 4.

Synthetic Example 14

Production of Thermoplastic Resin (C-4)

A copolymer (C-4) was obtained as a thermoplastic resin (C-4) by a known suspension polymerization method. The chemical composition and the reduced viscosity of the resin are described in Table 4.

A polycarbonate resin (Iupilon S-3000 (viscosity average molecular weight (Mv): 21,000), manufactured by Mitsubishi Engineering-Plastics Corporation) was used as a thermoplastic resin (C-5).

The monomer compositions and the reduced viscosities of the copolymers (C-1) to (C-4) are described in Table 4.

TABLE 4

| Copolymer | AN | ST | AMS | PMID | MMA | MA | Reduced viscosity (dL/g) |
|---|---|---|---|---|---|---|---|
| (C-1) | 32 | 68 | | | | | 0.51 |
| (C-2) | 28 | 26 | 36 | 10 | | | 0.49 |
| (C-3) | 15 | 55 | | 30 | | | 0.62 |
| (C-4) | | | | | 98 | 2 | |

AN: acrylonitrile
ST: styrene
AMS: alpha-methylstyrene
PMID: N-phenylmaleimide
MMA: methyl methacrylate
MA: methyl acrylate Example 11

Production of Thermoplastic Resin Composition

Mixed together with a Henschel mixer were 16 parts of the graft copolymer (A-1), 24 parts of the graft copolymer (B-1), 30 parts of the thermoplastic resin (C-1), 30 parts of the thermoplastic resin (C-2), 0.5 parts of ethylene bisstearylamide, 0.5 parts of ADEKASTAB LA-63PK (manufactured by ADEKA CORPORATION), and 1 part of carbon black No. 960 (manufactured by Mitsubishi Chemical Corporation) as a colorant. The mixture was extruded with a degasification twin-screw extruder (TEX30α manufactured by The Japan Steel Works, Ltd.) at a barrel temperature of 240° C. to form pellets. The pellets were tested to determine the melt volume rate. The results are described in Table 5.

The resin pellets were molded with a 4-ounce injection molding machine (manufactured by The Japan Steel Works, Ltd.) at 220 to 260° C. to give desired test pieces. The test pieces were tested to determine the Charpy impact strength, the flexural modulus and the deflection temperature under load. Further, the gloss and the color production properties were measured with respect to the surface of 100×100×2 mm flat plate test pieces obtained by injection molding at an injection rate of 10 g/sec. or 40 g/sec. The results are described in Table 5.

Examples 12 to 28 and
Comparative Examples 3 to 5

Production of Thermoplastic Resin Compositions

Pellets of thermoplastic resin compositions were obtained in the same manner as in EXAMPLE 11, except that the acrylic rubber graft copolymers (A), the acrylic rubber graft copolymers (B), the graft copolymers (X) and the thermoplastic resins (C) were added in the amounts described in Table 5. The properties were measured, the results being described in Table 5.

TABLE 5*

| | Total amount of Graft copolymer (A) or (X) | | Rubbery polymers (A) (or Graft copolymer) (B) | | Thermoplastic resins (C) | | | | Rubbery polymers (mass %) | (X):(B) (parts) | Melt volume rate [cm³/10 min] | Charpy impact strength [kJ/m²] | Flexural modulus [GPa] | Deflection temperature under load [° C.] | Gloss [%] | | Color production properties L* | |
|---|---|---|---|---|---|---|---|---|---|---|---|---|---|---|---|---|---|---|
| | Type | parts | Type | parts | Type | parts | Type | parts | | | | | | | 10 g/sec. | 40 g/sec. | 10 g/sec. | 40 g/sec. |
| EX. 11 | (A-1) | 16 | (B-1) | 24 | (C-1) | 30 | (C-2) | 30 | 20 | 40:60 | 4.8 | 14.3 | 2.5 | 87 | 79 | 91 | 7.5 | 7.0 |
| EX. 12 | (A-2) | 16 | (B-1) | 24 | (C-1) | 30 | (C-2) | 30 | 20 | 40:60 | 4.5 | 10.0 | 2.4 | 87 | 87 | 93 | 6.8 | 6.5 |
| EX. 13 | (A-3) | 16 | (B-1) | 24 | (C-1) | 30 | (C-2) | 30 | 20 | 40:60 | 5.0 | 12.2 | 2.5 | 87 | 64 | 85 | 10.3 | 9.1 |
| EX. 14 | (A-4) | 16 | (B-1) | 24 | (C-1) | 30 | (C-2) | 30 | 20 | 40:60 | 4.4 | 9.5 | 2.5 | 87 | 91 | 94 | 6.4 | 6.2 |
| EX. 15 | (A-5) | 16 | (B-1) | 24 | (C-1) | 30 | (C-2) | 30 | 20 | 40:60 | 5.2 | 15.1 | 2.5 | 87 | 60 | 85 | 11.1 | 9.3 |
| EX. 16 | (A-6) | 16 | (B-1) | 24 | (C-1) | 30 | (C-2) | 30 | 20 | 40:60 | 5.3 | 14.8 | 2.5 | 87 | 68 | 84 | 11.4 | 10.0 |
| EX. 17 | (A-7) | 16 | (B-1) | 24 | (C-1) | 30 | (C-2) | 30 | 20 | 40:60 | 4.3 | 10.5 | 2.5 | 87 | 86 | 90 | 7.6 | 7.3 |
| EX. 18 | (A-8) | 16 | (B-1) | 24 | (C-1) | 30 | (C-2) | 30 | 20 | 40:60 | 4.5 | 15.4 | 2.5 | 87 | 71 | 90 | 9.9 | 8.3 |
| EX. 19 | (A-1) | 16 | (B-2) | 24 | (C-1) | 30 | (C-2) | 30 | 20 | 40:60 | 5.0 | 11.0 | 2.5 | 87 | 83 | 87 | 8.6 | 8.5 |
| EX. 20 | (A-1) | 16 | (B-3) | 24 | (C-1) | 30 | (C-2) | 30 | 20 | 40:60 | 4.8 | 11.7 | 2.5 | 87 | 82 | 90 | 8.1 | 7.8 |
| EX. 21 | (A-1) | 16 | (B-1) | 24 | (C-1) | 60 | | | 20 | 40:60 | 15.0 | 14.0 | 2.4 | 82 | 92 | 93 | 6.7 | 6.3 |
| EX. 22 | (A-1) | 16 | (B-1) | 24 | (C-1) | 45 | (C-3) | 15 | 20 | 40:60 | 5.4 | 12.8 | 2.5 | 86 | 79 | 90 | 9.0 | 7.8 |
| EX. 23 | (A-1) | 13.2 | (B-1) | 19.8 | (C-1) | 37 | (C-2) | 30 | 16.5 | 40:60 | 7.0 | 10.2 | 2.5 | 86 | 93 | 95 | 6.0 | 5.9 |
| EX. 24 | (A-1) | 22.4 | (B-1) | 33.6 | (C-1) | 14 | (C-2) | 30 | 28 | 40:60 | 2.8 | 18.7 | 2.0 | 81 | 59 | 84 | 16.5 | 14.0 |
| EX. 25 | (A-1) | 28 | (B-1) | 12 | (C-1) | 30 | (C-2) | 30 | 20 | 70:30 | 5.8 | 9.2 | 2.5 | 87 | 82 | 90 | 8.3 | 8.0 |
| EX. 26 | (A-1) | 8 | (B-1) | 32 | (C-1) | 30 | (C-2) | 30 | 20 | 20:80 | 4.3 | 8.5 | 2.5 | 87 | 67 | 88 | 7.9 | 6.7 |
| EX. 27 | (A-9) | 16 | (B-1) | 24 | (C-1) | 30 | (C-2) | 30 | 20 | 40:60 | 6.0 | 13.0 | 2.5 | 87 | 48 | 73 | 20.9 | 18.0 |
| EX. 28 | (A-10) | 16 | (B-1) | 24 | (C-1) | 30 | (C-2) | 30 | 20 | 40:60 | 4.0 | 7.8 | 2.5 | 87 | 84 | 90 | 7.8 | 7.3 |
| COMP. EX. 3 | (X-1) | 16 | (B-1) | 24 | (C-1) | 30 | (C-2) | 30 | 20 | 40:60 | 3.0 | 13.6 | 2.5 | 87 | 31 | 55 | 21.1 | 16.3 |
| COMP. EX. 4 | (X-2) | 16 | (B-1) | 24 | (C-1) | 30 | (C-2) | 30 | 20 | 40:60 | 5.4 | 9.0 | 2.5 | 87 | 39 | 64 | 14.7 | 11.8 |
| COMP. EX. 5 | — | — | (B-1) | 40 | (C-1) | 30 | (C-2) | 30 | 20 | 0:100 | 4.0 | 4.7 | 2.4 | 87 | 55 | 84 | 9.1 | 6.8 |

[Discussions]

From Table 5, the following has been demonstrated.

COMPARATIVE EXAMPLE 3 resulted in an inferior appearance with poor gloss and low color production properties due to the use of the acrylic rubber graft copolymer (X-1) free of units derived from allyl methacrylate which was an essential polyfunctional monomer having two unsaturated bonds in the present invention. The balance among impact strength, gloss and color production properties was bad in COMPARATIVE EXAMPLE 4 which involved the acrylic rubber graft copolymer (X-2) free of units derived from triallyl isocyanurate which was a polyfunctional monomer having three unsaturated bonds. Further, COMPARATIVE EXAMPLE 5 which did not involve any acrylic rubber graft copolymers (A) according to the invention resulted in a poor balance between impact strength and flexural modulus. In all COMPARATIVE EXAMPLES, the articles exhibited significant variations in gloss and color production properties depending on whether they had been produced by low-rate molding or high-rate molding. Thus, these compositions were shown to have a high dependency on injection rate.

In contrast, the inventive thermoplastic resin compositions of EXAMPLES 11 to 28 which contained the acrylic rubber graft copolymer (A) according to the invention achieved good properties in terms of mechanical strength such as impact strength and flexural modulus as well as in terms of appearance such as gloss and color production properties.

Examples 29 to 44 and Comparative Examples 6 to 8

Production of Thermoplastic Resin Compositions

Pellets of thermoplastic resin compositions were obtained in the same manner as in EXAMPLE 11, except that the thermoplastic resins (C-1) and (C-2) in EXAMPLE 11 were changed to the thermoplastic resin (C-4) which was a (meth)acrylic resin, and that the acrylic rubber graft copolymers (A), the acrylic rubber graft copolymers (B), the graft copolymers (X) and the thermoplastic resins (C) were added in the amounts described in Table 6. The properties were measured, the results being described in Table 6.

TABLE 6

| | Graft copolymer (A) or (X) | | Graft copolymer (B) | | Thermoplastic resins (C) | | Total amount of rubbery polymers (parts) | Rubbery polymers (A) (or (X)):(B) (mass %) | Melt volume rate [cm³/10 min] | Charpy impact strength [kJ/m²] | Flexural modulus [GPa] | Deflection temperature under load [° C.] | Gloss [%] | Color production properties L* |
|---|---|---|---|---|---|---|---|---|---|---|---|---|---|---|
| | Type | parts | Type | parts | Type | parts | | | | | | | | |
| EX. 29 | (A-1) | 17 | (B-1) | 25 | (C-4) | 58 | 21 | 40:60 | 6.1 | 11.5 | 2.0 | 75 | 89 | 6.5 |
| EX. 30 | (A-2) | 17 | (B-1) | 25 | (C-4) | 58 | 21 | 40:60 | 5.7 | 10.3 | 2.0 | 75 | 92 | 6.0 |
| EX. 31 | (A-3) | 17 | (B-1) | 25 | (C-4) | 58 | 21 | 40:60 | 6.4 | 11.7 | 2.0 | 75 | 86 | 7.7 |

TABLE 6-continued

| | Graft copolymer (A) or (X) | | Graft copolymer (B) | | Thermo-plastic resins (C) | | Total amount of rubbery polymers (parts) | Rubbery polymers (A) (or (X)):(B) (mass %) | Melt volume rate [cm³/ 10 min] | Charpy impact strength [kJ/m²] | Flexural modulus [GPa] | Deflection temperature under load [° C.] | Gloss [%] | Color production properties L* |
|---|---|---|---|---|---|---|---|---|---|---|---|---|---|---|
| | Type | parts | Type | parts | Type | parts | | | | | | | | |
| EX. 32 | (A-4) | 17 | (B-1) | 25 | (C-4) | 58 | 21 | 40:60 | 5.6 | 10.0 | 2.0 | 75 | 93 | 5.9 |
| EX. 33 | (A-5) | 17 | (B-1) | 25 | (C-4) | 58 | 21 | 40:60 | 6.6 | 12.3 | 2.0 | 75 | 84 | 8.0 |
| EX. 34 | (A-6) | 17 | (B-1) | 25 | (C-4) | 58 | 21 | 40:60 | 6.8 | 12.5 | 2.0 | 75 | 84 | 8.2 |
| EX. 35 | (A-7) | 17 | (B-1) | 25 | (C-4) | 58 | 21 | 40:60 | 5.5 | 10.4 | 2.0 | 75 | 89 | 6.6 |
| EX. 36 | (A-8) | 17 | (B-1) | 25 | (C-4) | 58 | 21 | 40:60 | 5.7 | 12.0 | 2.0 | 75 | 89 | 7.2 |
| EX. 37 | (A-1) | 17 | (B-2) | 25 | (C-4) | 58 | 21 | 40:60 | 6.3 | 11.5 | 2.0 | 75 | 87 | 7.0 |
| EX. 38 | (A-1) | 17 | (B-3) | 25 | (C-4) | 58 | 21 | 40:60 | 6.2 | 11.8 | 2.0 | 75 | 88 | 6.8 |
| EX. 39 | (A-1) | 15 | (B-1) | 23 | (C-4) | 62 | 19 | 40:60 | 7.4 | 9.8 | 2.3 | 77 | 94 | 5.7 |
| EX. 40 | (A-1) | 19 | (B-1) | 29 | (C-4) | 52 | 24 | 40:60 | 3.7 | 16.8 | 1.8 | 73 | 85 | 8.4 |
| EX. 41 | (A-1) | 29.4 | (B-1) | 12.6 | (C-4) | 58 | 21 | 70:30 | 7.1 | 9.0 | 2.0 | 75 | 91 | 7.0 |
| EX. 42 | (A-1) | 8.4 | (B-1) | 33.6 | (C-4) | 58 | 21 | 20:80 | 5.5 | 8.5 | 2.0 | 75 | 84 | 6.2 |
| EX. 43 | (A-9) | 17 | (B-1) | 25 | (C-4) | 58 | 21 | 40:60 | 7.5 | 11.6 | 2.0 | 75 | 78 | 10.8 |
| EX. 44 | (A-10) | 17 | (B-1) | 25 | (C-4) | 58 | 21 | 40:60 | 5.1 | 8.2 | 2.0 | 75 | 95 | 5.6 |
| COMP. EX. 6 | (X-1) | 17 | (B-1) | 25 | (C-4) | 58 | 21 | 40:60 | 3.6 | 11.0 | 2.0 | 75 | 57 | 14.0 |
| COMP. EX. 7 | (X-2) | 17 | (B-1) | 25 | (C-4) | 58 | 21 | 40:60 | 6.7 | 8.1 | 2.0 | 75 | 71 | 10.3 |
| COMP. EX. 8 | — | — | (B-1) | 42 | (C-4) | 58 | 21 | 0:100 | 3.6 | 4.7 | 2.1 | 76 | 91 | 4.6 |

[Discussions]

From Table 6, the following has been demonstrated.

COMPARATIVE EXAMPLE 6 resulted in an inferior appearance with poor gloss and low color production properties due to the use of the acrylic rubber graft copolymer (X-1) free of units derived from allyl methacrylate which was an essential polyfunctional monomer having two unsaturated bonds in the present invention. The balance among impact strength, gloss and color production properties was bad in COMPARATIVE EXAMPLE 7 which involved the acrylic rubber graft copolymer (X-2) free of units derived from triallyl isocyanurate which was a polyfunctional monomer having three unsaturated bonds. Further, COMPARATIVE EXAMPLE 8 which did not involve any acrylic rubber graft copolymers (A) according to the invention resulted in a poor balance between impact strength and flexural modulus.

In contrast, the inventive thermoplastic resin compositions of EXAMPLES 29 to 44 which contained the acrylic rubber graft copolymer (A) according to the invention achieved good properties in terms of mechanical strength such as impact strength and flexural modulus as well as in terms of appearance such as gloss and color production properties, even when the (meth)acrylic resin (C-4) was used as the thermoplastic resin (C).

Example 45

Production of Thermoplastic Resin Composition

Mixed together with a Henschel mixer were 6 parts of the graft copolymer (A-1), 9 parts of the graft copolymer (B-1), 45 parts of the thermoplastic resin (C-1), 40 parts of the thermoplastic resin (C-5), 0.5 parts of a paraffin wax, 0.5 parts of ADEKASTAB LA-63PK (manufactured by ADEKA CORPORATION), and 1 part of carbon black No. 960 (manufactured by Mitsubishi Chemical Corporation) as a colorant. The mixture was extruded with a degasification twin-screw extruder (TEX30α manufactured by The Japan Steel Works, Ltd.) at a barrel temperature of 250° C. to form pellets. The pellets were tested to determine the melt volume rate. The results are described in Table 7.

The resin pellets were molded with a 4-ounce injection molding machine (manufactured by The Japan Steel Works, Ltd.) at 250 to 270° C. to give desired test pieces. The test pieces were tested to determine the Charpy impact strength, the flexural modulus, the deflection temperature under load, the gloss and the color production properties. The results are described in Table 7.

Examples 46 to 63 and
Comparative Examples 9 to 12

Production of Thermoplastic Resin Compositions

Pellets of thermoplastic resin compositions were obtained in the same manner as in EXAMPLE 45, except that the acrylic rubber graft copolymers (A), the acrylic rubber graft copolymers (B), the graft copolymers (X) and the thermoplastic resins (C-1) and (C-5) were added in the amounts described in Table 7. The properties were measured, the results being described in Table 7.

TABLE 7

| | Graft co-polymer (A) or (X) | | Graft co-polymer (B) | | Thermoplastic resins (C) | | | | Total amount of rubbery polymers (parts) | Rubbery polymers (A) (or (X)):(B) (mass %) | Melt volume rate [cm³/ 10 min] | Charpy impact strength [kJ/m²] | Flexural modulus [GPa] | Deflection temp-erature under load [° C.] | Gloss [%] | Color production properties L* |
|---|---|---|---|---|---|---|---|---|---|---|---|---|---|---|---|---|
| | Type | parts | Type | parts | Type | parts | Type | parts | | | | | | | | |
| EX. 45 | (A-1) | 6 | (B-1) | 9 | (C-1) | 45 | (C-5) | 40 | 7.5 | 40:60 | 10.0 | 42.2 | 2.7 | 95 | 91 | 9.1 |
| EX. 46 | (A-2) | 6 | (B-1) | 9 | (C-1) | 45 | (C-5) | 40 | 7.5 | 40:60 | 9.6 | 38.8 | 2.6 | 95 | 95 | 7.0 |

TABLE 7-continued

| | Graft co-polymer (A) or (X) | | Graft co-polymer (B) | | Thermoplastic resins (C) | | | | Total amount of rubbery polymers (parts) | Rubbery polymers (A) (or (X)):(B) (mass %) | Melt volume rate [cm³/ 10 min] | Charpy impact strength [kJ/m²] | Flexural modulus [GPa] | Deflection temperature under load [° C.] | Gloss [%] | Color production properties L* |
|---|---|---|---|---|---|---|---|---|---|---|---|---|---|---|---|---|
| | Type | parts | Type | parts | Type | parts | Type | parts | | | | | | | | |
| EX. 47 | (A-3) | 6 | (B-1) | 9 | (C-1) | 45 | (C-5) | 40 | 7.5 | 40:60 | 10.5 | 42.5 | 2.7 | 95 | 84 | 10.0 |
| EX. 48 | (A-4) | 6 | (B-1) | 9 | (C-1) | 45 | (C-5) | 40 | 7.5 | 40:60 | 9.6 | 38.1 | 2.7 | 95 | 97 | 6.3 |
| EX. 49 | (A-5) | 6 | (B-1) | 9 | (C-1) | 45 | (C-5) | 40 | 7.5 | 40:60 | 11.2 | 43.9 | 2.7 | 95 | 83 | 10.8 |
| EX. 50 | (A-6) | 6 | (B-1) | 9 | (C-1) | 45 | (C-5) | 40 | 7.5 | 40:60 | 11.0 | 44.2 | 2.7 | 95 | 82 | 11.3 |
| EX. 51 | (A-7) | 6 | (B-1) | 9 | (C-1) | 45 | (C-5) | 40 | 7.5 | 40:60 | 9.7 | 38.6 | 2.7 | 95 | 89 | 9.2 |
| EX. 52 | (A-8) | 6 | (B-1) | 9 | (C-1) | 45 | (C-5) | 40 | 7.5 | 40:60 | 9.5 | 43.3 | 2.7 | 95 | 85 | 9.8 |
| EX. 53 | (A-1) | 6 | (B-2) | 9 | (C-1) | 45 | (C-5) | 40 | 7.5 | 40:60 | 10.8 | 42.5 | 2.7 | 95 | 88 | 9.5 |
| EX. 54 | (A-1) | 6 | (B-3) | 9 | (C-1) | 45 | (C-5) | 40 | 7.5 | 40:60 | 10.2 | 43.1 | 2.7 | 95 | 89 | 9.2 |
| EX. 55 | (A-1) | 6 | (B-1) | 9 | (C-1) | 65 | (C-5) | 20 | 7.5 | 40:60 | 17.0 | 17.4 | 2.9 | 89 | 86 | 9.8 |
| EX. 56 | (A-1) | 6 | (B-1) | 9 | (C-1) | 25 | (C-5) | 60 | 7.5 | 40:60 | 5.0 | 67.7 | 2.5 | 103 | 96 | 8.5 |
| EX. 57 | (A-1) | 6 | (B-1) | 9 | (C-1) | 5 | (C-5) | 80 | 7.5 | 40:60 | 3.0 | 59.2 | 2.2 | 115 | 95 | 8.4 |
| EX. 58 | (A-1) | 10 | (B-1) | 15 | (C-1) | 35 | (C-5) | 40 | 12.5 | 40:60 | 6.9 | 71.6 | 2.4 | 91 | 85 | 10.0 |
| EX. 59 | (A-1) | 13.2 | (B-1) | 19.8 | (C-1) | 27 | (C-5) | 40 | 16.5 | 40:60 | 6.2 | 84.8 | 2.3 | 90 | 82 | 11.1 |
| EX. 60 | (A-1) | 10.5 | (B-1) | 4.5 | (C-1) | 45 | (C-5) | 40 | 7.5 | 70:30 | 11.0 | 43.4 | 2.7 | 95 | 90 | 9.0 |
| EX. 61 | (A-1) | 3 | (B-1) | 12 | (C-1) | 45 | (C-5) | 40 | 7.5 | 20:80 | 8.0 | 39.7 | 2.7 | 95 | 94 | 8.7 |
| EX. 62 | (A-9) | 6 | (B-1) | 9 | (C-1) | 45 | (C-5) | 40 | 7.5 | 40:60 | 12.0 | 42.3 | 2.7 | 95 | 80 | 12.1 |
| EX. 63 | (A-10) | 6 | (B-1) | 9 | (C-1) | 45 | (C-5) | 40 | 7.5 | 40:60 | 9.2 | 27.1 | 2.7 | 95 | 91 | 9.3 |
| COMP. EX. 9 | (X-1) | 6 | (B-1) | 9 | (C-1) | 45 | (C-5) | 40 | 7.5 | 40:60 | 7.0 | 44.0 | 2.7 | 95 | 38 | 17.8 |
| COMP. EX. 10 | (X-2) | 6 | (B-1) | 9 | (C-1) | 45 | (C-5) | 40 | 7.5 | 40:60 | 10.2 | 34.9 | 2.7 | 95 | 73 | 12.6 |
| COMP. EX. 11 | — | — | (B-1) | 15 | (C-1) | 45 | (C-5) | 40 | 7.5 | 0:100 | 11.0 | 9.8 | 2.8 | 94 | 97 | 6.3 |
| COMP. EX. 12 | (A-1) | 2.4 | (B-1) | 3.6 | (C-1) | 54 | (C-5) | 40 | 3.0 | 40:60 | 16.0 | 5.1 | 2.9 | 97 | 98 | 4.5 |

[Discussions]

From Table 7, the following has been demonstrated.

COMPARATIVE EXAMPLE 9 resulted in an inferior appearance with poor gloss and low color production properties due to the use of the acrylic rubber graft copolymer (X-1) free of units derived from allyl methacrylate which was an essential polyfunctional monomer having two unsaturated bonds in the present invention. The balance among impact strength, gloss and color production properties was bad in COMPARATIVE EXAMPLE 10 which involved the acrylic rubber graft copolymer (X-2) free of units derived from triallyl isocyanurate which was a polyfunctional monomer having three unsaturated bonds. Further, COMPARATIVE EXAMPLE 11 which did not involve any acrylic rubber graft copolymers (A) according to the invention resulted in a poor balance between impact strength and flexural modulus. In COMPARATIVE EXAMPLE 12, a marked decrease in impact strength was caused due to the small amount of the total of rubbery polymers in the thermoplastic resin composition.

In contrast, the inventive thermoplastic resin compositions of EXAMPLES 45 to 63 which contained the acrylic rubber graft copolymer (A) according to the invention achieved good properties in terms of mechanical strength such as impact strength and flexural modulus as well as in terms of appearance such as gloss and color production properties, even when the styrene resin (C-1) and the polycarbonate resin (C-5) were used as the thermoplastic resins (C).

INDUSTRIAL APPLICABILITY

The acrylic rubber graft copolymers (A) and the thermoplastic resin compositions according to the present invention have an excellent balance among impact resistance, rigidity and appearance, and further exhibit excellent weather resistance. Thus, these materials are suitably used in automobile materials, building materials and home appliance materials which have come into use recently.

Although the present invention has been described in detail with respect to some specific embodiments, the skilled person will appreciate that various modifications are possible within the spirit and the scope of the invention.

This application is based upon a Japanese patent application filed on Mar. 29, 2011 (Japanese Patent Application No. 2011-072129), the entire contents of which are incorporated herein by reference.

The invention claimed is:

1. An acrylic rubber graft copolymer, comprising:
a graft polymerized vinyl monomer in a presence of a rubbery polymer including acrylate ester monomer units and polyfunctional monomer units having an allyl group,
wherein a total amount of the polyfunctional monomer units in the rubbery polymer is 0.3 to 3 parts by mass with respect to 100 parts by mass of the acrylate ester monomer units,
the polyfunctional monomer units include 30 to 95 mass % of polyfunctional monomer units having two unsaturated bonds and 5 to 70 mass % of polyfunctional monomer units having three unsaturated bonds, with respect to 100 mass % of the total of the polyfunctional monomer units, and
the polyfunctional monomer units having two unsaturated bonds are allyl methacrylate.

2. The acrylic rubber graft copolymer according to claim 1, wherein the rubbery polymer is a polymer obtained by mixing a copolymer latex obtained by polymerizing a monomer mixture including an acrylate ester monomer and polyfunctional monomers together with an acid group-containing copolymer latex to enlarge the polymer, and thereafter further adding a monomer including an acrylate ester monomer and polymerizing the monomer to the enlarged polymer.

3. The acrylic rubber graft copolymer according to claim 1, wherein the rubbery polymer has a volume average particle diameter of 300 to 600 nm.

4. A thermoplastic resin composition, comprising:
the acrylic rubber graft copolymer described in claim 1 as an acrylic rubber graft copolymer (A).

5. The thermoplastic resin composition according to claim 4, further comprising an acrylic rubber graft copolymer (B) having a volume average particle diameter of 70 to 200 nm and a graft polymerized vinyl monomer in a presence of a rubbery polymer including acrylate ester monomer units.

6. The thermoplastic resin composition according to claim 5, wherein the thermoplastic resin composition includes the rubbery polymers in a total amount of 5 to 30 parts by mass with respect to 100 parts by mass of resin components in the thermoplastic resin composition and wherein an amount of the rubbery polymer in the acrylic rubber graft copolymer (A) is 20 to 70 mass % and an amount of the rubbery polymer in the acrylic rubber graft copolymer (B) is 30 to 80 mass % with respect to a total of the rubbery polymers in the thermoplastic resin composition taken as 100 mass %.

7. A thermoplastic resin shaped article obtained by shaping the thermoplastic resin composition described in claim 4.

8. The acrylic rubber graft copolymer according to claim 1, wherein the polyfunctional monomer units having three unsaturated bonds are triallyl isocyanurate.

* * * * *